United States Patent
Srinivasan et al.

(10) Patent No.: US 12,353,413 B2
(45) Date of Patent: Jul. 8, 2025

(54) QUALITY EVALUATION AND AUGMENTATION OF DATA PROVIDED BY A FEDERATED QUERY SYSTEM

(71) Applicant: Optum, Inc., Minnetonka, MN (US)

(72) Inventors: Srivatsan Srinivasan, Lake Stevens, WA (US); Priyadarshni Natarajan, Redmond, WA (US); Sanjeeva L. Fernando, Cohasset, MA (US); John Jose Gerard Anto Arokiasamy, Chaska, MN (US)

(73) Assignee: Optum, Inc., Minnetonka, MN (US)

( * ) Notice: Subject to any disclaimer, the term of this patent is extended or adjusted under 35 U.S.C. 154(b) by 0 days.

(21) Appl. No.: 18/365,485

(22) Filed: Aug. 4, 2023

(65) Prior Publication Data
US 2025/0045276 A1 Feb. 6, 2025

(51) Int. Cl.
*G06F 16/215* (2019.01)
*G06F 16/2453* (2019.01)
*G06F 16/248* (2019.01)

(52) U.S. Cl.
CPC ...... *G06F 16/24544* (2019.01); *G06F 16/215* (2019.01); *G06F 16/24532* (2019.01); *G06F 16/248* (2019.01)

(58) Field of Classification Search
CPC ............. G06F 16/215; G06F 16/24544; G06F 16/24532; G06F 16/248
See application file for complete search history.

(56) References Cited

U.S. PATENT DOCUMENTS 1,372,871 A * 3/1921 Droll .................... D05B 11/005
                                                      112/2.1
6,901,403 B1   5/2005 Bata et al.
(Continued)

FOREIGN PATENT DOCUMENTS

WO   2011/155743 A2   12/2011
WO   2012/007745 A2    1/2012
(Continued)

OTHER PUBLICATIONS

Anaissi, et al., "A Personalized Federated Learning Algorithm: An Application in Anomaly Detection", (10 pages), Nov. 5, 2021, arXiv:2111.02627v1.
(Continued)

*Primary Examiner* — Tarek Chbouki
(74) *Attorney, Agent, or Firm* — Alston & Bird LLP

(57) ABSTRACT

Various embodiments of the present disclosure provide federated query processing techniques for quality evaluation and augmentation of data provided by a federated query system. The techniques include receiving an execution plan for a federated query. The techniques also include receiving one or more data segments from a plurality of third-party data sources and receiving quality evaluation data using a set of data accessing tasks for the execution plan. The techniques also include generating a result set for the federated query using a set of data processing tasks for the execution plan. Additionally, the techniques include generating quality metrics data for the one or more data segments based on the quality evaluation data and generating an augmented result set for the federated query based on the result set and the quality metrics data.

20 Claims, 8 Drawing Sheets

(56) References Cited

U.S. PATENT DOCUMENTS

| | | | |
|---|---|---|---|
| 6,950,823 B2 | 9/2005 | Amiri et al. | |
| 7,403,956 B2 | 7/2008 | Vaschillo et al. | |
| 7,831,594 B2 | 11/2010 | Mehta et al. | |
| 7,945,581 B2 | 5/2011 | Bayliss et al. | |
| 8,341,104 B2 | 12/2012 | Manickam et al. | |
| 8,515,975 B1* | 8/2013 | Federici | G06F 16/951 |
| | | | 707/750 |
| 8,539,345 B2 | 9/2013 | Appleyard et al. | |
| 8,572,031 B2 | 10/2013 | Merriman et al. | |
| 8,762,406 B2 | 6/2014 | Ho et al. | |
| 8,930,410 B2 | 1/2015 | Alton et al. | |
| 9,116,812 B2 | 8/2015 | Joshi et al. | |
| 9,246,776 B2 | 1/2016 | Ellsworth et al. | |
| 9,390,112 B1 | 7/2016 | Daly et al. | |
| 9,489,440 B2 | 11/2016 | Stritzel et al. | |
| 9,558,230 B2 | 1/2017 | Hollifield et al. | |
| 9,600,504 B2 | 3/2017 | Marrelli et al. | |
| 9,646,226 B2 | 5/2017 | Wang et al. | |
| 10,185,728 B2 | 1/2019 | Nath et al. | |
| 10,229,161 B2 | 3/2019 | Kakarla et al. | |
| 10,296,524 B1* | 5/2019 | Tung | G06F 16/248 |
| 10,409,802 B2 | 9/2019 | Spitz et al. | |
| 10,698,954 B2 | 6/2020 | Piechowicz et al. | |
| 10,719,301 B1 | 7/2020 | Dasgupta et al. | |
| 10,762,539 B2 | 9/2020 | Murugesan et al. | |
| 10,795,598 B1 | 10/2020 | Vohra | |
| 10,817,483 B1* | 10/2020 | Samdani | G06F 16/215 |
| 10,867,063 B1 | 12/2020 | Avanes et al. | |
| 10,872,236 B1 | 12/2020 | Elor et al. | |
| 10,896,176 B1 | 1/2021 | Creedon et al. | |
| 10,908,926 B2 | 2/2021 | Coven et al. | |
| 11,074,107 B1 | 7/2021 | Nandakumar | |
| 11,093,500 B2 | 8/2021 | Gladwin et al. | |
| 11,094,029 B2 | 8/2021 | Kalamkar et al. | |
| 11,100,420 B2 | 8/2021 | Dirac et al. | |
| 11,113,784 B2 | 9/2021 | Ray et al. | |
| 11,119,980 B2 | 9/2021 | Szczepanik et al. | |
| 11,126,632 B2 | 9/2021 | Pal et al. | |
| 11,157,470 B2 | 10/2021 | Schuetz | |
| 11,204,851 B1 | 12/2021 | Iyengar et al. | |
| 11,281,673 B2 | 3/2022 | Nanda et al. | |
| 11,301,467 B2* | 4/2022 | Slezak | G06N 7/01 |
| 11,321,330 B1 | 5/2022 | Pandis et al. | |
| 11,475,350 B2 | 10/2022 | McMahan et al. | |
| 11,550,812 B2 | 1/2023 | Liu et al. | |
| 11,636,108 B1 | 4/2023 | Xu et al. | |
| 2004/0153435 A1 | 8/2004 | Gudbjartsson et al. | |
| 2006/0218149 A1 | 9/2006 | Patrick | |
| 2006/0259977 A1 | 11/2006 | Patrick | |
| 2008/0104089 A1* | 5/2008 | Pragada | G06F 16/2471 |
| | | | 707/E17.135 |
| 2012/0210066 A1 | 8/2012 | Joshi et al. | |
| 2012/0290592 A1 | 11/2012 | Ishii | |
| 2012/0317096 A1 | 12/2012 | Kaufmann et al. | |
| 2013/0086039 A1 | 4/2013 | Salch et al. | |
| 2013/0132360 A1* | 5/2013 | Kuznetsov | G06F 16/9535 |
| | | | 707/706 |
| 2013/0159288 A1* | 6/2013 | Nikankin | G06Q 40/03 |
| | | | 707/E17.014 |
| 2015/0169685 A1 | 6/2015 | Elias et al. | |
| 2015/0193697 A1 | 7/2015 | Vasseur et al. | |
| 2016/0147888 A1 | 5/2016 | Nguyen et al. | |
| 2017/0013046 A1 | 1/2017 | Flynn | |
| 2017/0220605 A1 | 8/2017 | Nivala et al. | |
| 2017/0269921 A1 | 9/2017 | Martin Vicente et al. | |
| 2017/0329466 A1 | 11/2017 | Krenkler et al. | |
| 2018/0293276 A1 | 10/2018 | Bae et al. | |
| 2018/0375720 A1 | 12/2018 | Yang et al. | |
| 2019/0146978 A1* | 5/2019 | Beedgen | G06F 16/2228 |
| | | | 707/754 |
| 2019/0196890 A1 | 6/2019 | Bucchi et al. | |
| 2019/0311372 A1* | 10/2019 | Lindner | G06N 20/00 |
| 2019/0369969 A1 | 12/2019 | Donohoe et al. | |
| 2019/0392296 A1 | 12/2019 | Brady et al. | |
| 2020/0034742 A1 | 1/2020 | Dirac et al. | |
| 2020/0050612 A1 | 2/2020 | Bhattacharjee et al. | |
| 2020/0082010 A1 | 3/2020 | Bodziony et al. | |
| 2020/0117434 A1 | 4/2020 | Biskup et al. | |
| 2020/0202171 A1 | 6/2020 | Hughes et al. | |
| 2020/0226012 A1 | 7/2020 | Pitre et al. | |
| 2020/0250525 A1 | 8/2020 | Kumar Addepalli et al. | |
| 2020/0319877 A1 | 10/2020 | Glazer et al. | |
| 2020/0320379 A1 | 10/2020 | Watson et al. | |
| 2020/0349161 A1 | 11/2020 | Siddiqui et al. | |
| 2020/0401891 A1 | 12/2020 | Xu et al. | |
| 2021/0019665 A1 | 1/2021 | Gur et al. | |
| 2021/0081837 A1 | 3/2021 | Polleri et al. | |
| 2021/0097343 A1 | 4/2021 | Goodsitt et al. | |
| 2021/0174164 A1 | 6/2021 | Hsieh et al. | |
| 2021/0286657 A1 | 9/2021 | Mathur et al. | |
| 2021/0294577 A1 | 9/2021 | Dunn et al. | |
| 2021/0304362 A1* | 9/2021 | Palmaro | A63F 13/67 |
| 2021/0334651 A1 | 10/2021 | Leng et al. | |
| 2021/0390455 A1 | 12/2021 | Schierz et al. | |
| 2022/0067181 A1 | 3/2022 | Carley | |
| 2022/0078264 A1 | 3/2022 | Mathur | |
| 2022/0086393 A1 | 3/2022 | Peters et al. | |
| 2022/0091837 A1 | 3/2022 | Chai et al. | |
| 2022/0108177 A1 | 4/2022 | Samek et al. | |
| 2022/0114451 A1 | 4/2022 | Muñoz et al. | |
| 2022/0129581 A1 | 4/2022 | Jones et al. | |
| 2022/0138561 A1 | 5/2022 | Prendki | |
| 2022/0172040 A1 | 6/2022 | Kazi et al. | |
| 2022/0245176 A1* | 8/2022 | Weisman | G06F 16/26 |
| 2022/0269691 A1* | 8/2022 | Liu | G06F 9/54 |
| 2022/0300850 A1 | 9/2022 | Mendez et al. | |
| 2022/0374914 A1 | 11/2022 | Morrill et al. | |
| 2022/0407861 A1 | 12/2022 | Beecham et al. | |
| 2023/0152994 A1 | 5/2023 | Jiang et al. | |
| 2023/0315731 A1 | 10/2023 | Xu et al. | |
| 2023/0325389 A1 | 10/2023 | Fan et al. | |
| 2023/0418468 A1 | 12/2023 | Shah et al. | |
| 2024/0078333 A1 | 3/2024 | Lim et al. | |
| 2024/0134842 A1* | 4/2024 | Kim | G06F 16/2365 |
| 2024/0320231 A1 | 9/2024 | Bhattacharjee et al. | |

FOREIGN PATENT DOCUMENTS

| | | |
|---|---|---|
| WO | 2021/144803 A1 | 7/2021 |
| WO | 2022/185324 A1 | 9/2022 |
| WO | 2022/269526 A1 | 12/2022 |
| WO | WO-2023248204 A1 * | 12/2023 |

OTHER PUBLICATIONS

Cai, et al., "The Challenges of Data Quality and Data Quality Assessment in the Big Data Era", Data Science Journal, vol. 14, pp. 1-10, May 15, 2015, DOI: http://dx.doi.org/10.5334/dsj-2015-002.

Costa, et al., "A Survey on Data-Driven Performance Tuning for Big Data Analytics Platforms", Big Data Research, vol. 25, (17 pages), Jan. 27, 2021.

Debattista, et al., "A Methodology and Framework for Linked Data Quality Assessment", ACM Journal of Data and Information Quality, vol. 4, (29 pages), Jan. 2016, DOI: http://dx.doi.org/10.1145/0000000.0000000.

Devarajan, et al., "Acceleration via Multi-Tiered Data Buffering and Prefetching", Journal of Computer Science and Technology, vol. 35, pp. 92-120, Jan. 2020, DOI: 10.1007/s11390-020-9781-1.

Einziger, et al., "A Highly Efficient Cache Admission Policy", (24 pages), Dec. 3, 2015, arXiv:1512.00727v2.

Fuhl, et al., "Explainable Online Validation of Machine Learning Models for Practical Applications", (9 pages), Jan. 17, 2021, arXiv:2010.00821v3.

Hirano, et al., "RanSAP:An Open Dataset of Ransomware Storage Access Patterns for Training Machine Learning Models", Forensic Science International: Digital Investigation, vol. 40, (22 pages), Dec. 16, 2021, https://www.sciencedirect.com/science/article/pii/S2666281721002390.

Immuta, "Immuta Architecture: Dive Deeper into the Platform", (9 pages), Jan. 3, 2023, Retrieved from https://www.immuta.com/product/architecture/.

(56) References Cited

OTHER PUBLICATIONS

Jain et al., "Efficient Execution of Quantized Deep Learning Models: A Compiler Approach", (12 pages), Jun. 18, 2020, arXiv:2006.10226v1.

Janardhanan, PS, "Project Repositories for Machine Learning with TensorFlow", ScienceDirect, vol. 171, pp. 188-196, (2020).

Jin, Lei, "Software-Oriented Distributed Shared Cache Management for Chip Multiprocessors", University of Pittsburgh, (133 pages), 2010, http://d-scholarship.pitt.edu/8834/1/Lei.Jin.08.15.2010.PhD.Thesis.pdf.

Kopp, Andreas, "Practical Federated Learning with Azure Machine Learning", Towards Data Science, (21 pages), Aug. 17, 2022, https://towardsdatascience.com/practical-federated-learning-with-azure-machine-learning-8807f9bd1a7e.

Masolo, Claudio, "Google's BigQuery Introduces Column-Level Encryption Functions and Dynamic Masking of Information", InfoQ, (6 pages), Jul. 7, 2022, Retrieved from https://www.infoq.com/news/2022/07/google-bigquery-encryption/.

Pollok, et al., "Open Fabric for Deep Learning Models", IBM Research, (5 pages), 2018, Retrieved at https://openreview.net/pdf?id=SkgCTFpV2X.

Rivie' Res, et al., "Eclipse: A Platform for Integrating Development Tools", IBM Systems Journal, (14 pages), Jan. 2004, DOI: 10.1147/sj.432.0371.

Schwarz, et al., "Augmenting Web Pages and Search Results to Support Credibility Assessment", CHI 2011, (10 pages), May 7, 2011, https://juliaschwarz.net/assets/web-credibility/schwarz-chi11-web-credibility.

Snowflake, "Understanding Dynamic Data Masking", (1 page), Jan. 4, 2023, Retrieved from https://docs.snowflake.com/en/user-guide/security-column-ddm.html.

Vasilache, et al., "Tensor Comprehensions: Framework-Agnostic High-Performance Machine Learning Abstractions", (37 pages), Jun. 29, 2018, arXiv:1802.04730v3.

Witt, et al., "Predictive Performance Modeling for Distributed Computing Using Black-Box Monitoring and Machine Learning", Elsevier, (19 pages), May 30, 2018, arXiv:1805.11877v1.

Yates, et al., "Age-Optimal Constrained Cache Updating", IEEE International Symposium on Information Theory, (5 pages), 2017.

Cohen, Yoav, "Introducing Universal Masking", satori, (7 pages), Nov. 11, 2020, Retrieved on https://blog.satoricyber.com/introducing-universal-masking/.

Non-Final Rejection Mailed on Dec. 19, 2024 for U.S. Appl. No. 18/465,576, 7 page(s).

Notice of Allowance and Fees Due (PTOL-85) Mailed on Dec. 13, 2024 for U.S. Appl. No. 18/242,954, 2 page(s).

Notice of Allowance and Fees Due (PTOL-85) Mailed on Nov. 5, 2024 for U.S. Appl. No. 18/242,954, 2 page(s).

Non-Final Rejection Mailed on Sep. 28, 2024 for U.S. Appl. No. 18/462,846, 12 page(s).

Notice of Allowance and Fees Due (PTOL-85) Mailed on Oct. 2, 2024 for U.S. Appl. No. 18/242,954, 2 page(s).

Notice of Allowance and Fees Due (PTOL-85) Mailed on Sep. 10, 2024 for U.S. Appl. No. 18/242,954, 14 page(s).

Notice of Allowance and Fees Due (PTOL-85) Mailed on Apr. 14, 2025 for U.S. Appl. No. 18/465,576, 8 page (s).

Non-Final Rejection Mailed on Apr. 30, 2025 for U.S. Appl. No. 18/365,494, 11 page(s).

* cited by examiner

QUALITY EVALUATION AND AUGMENTATION OF DATA PROVIDED BY A FEDERATED QUERY SYSTEM

BACKGROUND

Various embodiments of the present disclosure address technical challenges related to federated query processing techniques given limitations of existing federated query engines. Existing federated query engines generate result datasets by repeatedly pulling data segments from disparate remote data sources to resolve a complex federated query. As such, resolving federated queries using existing federated query engines is time consuming and resource intensive. Various embodiments of the present disclosure make important contributions to various existing federated query engines by addressing these technical challenges.

BRIEF SUMMARY

In general, various embodiments of the present disclosure provide methods, apparatus, systems, computing devices, computing entities, and/or the like for quality evaluation and augmentation of data provided by a federated query system. Some embodiments of the present disclosure improve upon traditional query systems by enabling an on-demand data evaluation technique that leverages federated query processing downtimes to automatically evaluated data quality. The resulting data quality metrics may be provided with the results of the federated query to contextualize information. In this manner, some embodiments of the present disclosure may be practically applied in a federated query processing system to reduce computing resources traditionally expended for monitoring data quality, while improving data quality monitoring across robust third-party data sources.

In some embodiments, a computer-implemented method includes receiving, by one or more processors, a federated query that references one or more data segments from a plurality of third-party data sources. In some embodiments, the computer-implemented method additionally or alternatively includes receiving, by the one or more processors, an execution plan for the federated query, wherein the execution plan comprises a plurality of executable tasks for resolving the federated query, and the plurality of executable tasks comprises (i) a set of data accessing tasks for accessing the one or more data segments from the plurality of third-party data sources and (ii) a set of data processing tasks for processing the one or more data segments to generate a result set for the federated query. In some embodiments, the computer-implemented method additionally or alternatively includes receiving, by the one or more processors and using the set of data accessing tasks, the one or more data segments from the plurality of third-party data sources and quality evaluation data for the one or more data segments. In some embodiments, the computer-implemented method additionally or alternatively includes generating, by the one or more processors and using the set of data processing tasks, the result set for the federated query based on the one or more data segments. In some embodiments, the computer-implemented method additionally or alternatively includes generating, by the one or more processors, quality metrics data for the one or more data segments based on the quality evaluation data. In some embodiments, the computer-implemented method additionally or alternatively includes generating, by the one or more processors, an augmented result set for the federated query based on the result set and the quality metrics data.

In some embodiments, a system includes memory and one or more processors communicatively coupled to the memory. In some embodiments, the one or more processors are configured to receive a federated query that references one or more data segments from a plurality of third-party data sources. In some embodiments, the one or more processors are additionally or alternatively configured to receive an execution plan for the federated query, wherein the execution plan comprises a plurality of executable tasks for resolving the federated query, and the plurality of executable tasks comprises (i) a set of data accessing tasks for accessing the one or more data segments from the plurality of third-party data sources and (ii) a set of data processing tasks for processing the one or more data segments to generate a result set for the federated query. In some embodiments, the one or more processors are additionally or alternatively configured to receive, using the set of data accessing tasks, the one or more data segments from the plurality of third-party data sources and quality evaluation data for the one or more data segments. In some embodiments, the one or more processors are additionally or alternatively configured to generate, using the set of data processing tasks, the result set for the federated query based on the one or more data segments. In some embodiments, the one or more processors are additionally or alternatively configured to generate quality metrics data for the one or more data segments based on the quality evaluation data. In some embodiments, the one or more processors are additionally or alternatively configured to generate an augmented result set for the federated query based on the result set and the quality metrics data.

In some embodiments, one or more non-transitory computer-readable storage media include instructions that, when executed by one or more processors, cause the one or more processors to receive a federated query that references one or more data segments from a plurality of third-party data sources. In some embodiments, the instructions, when executed by the one or more processors, additionally or alternatively cause the one or more processors to receive an execution plan for the federated query, wherein the execution plan comprises a plurality of executable tasks for resolving the federated query, and the plurality of executable tasks comprises (i) a set of data accessing tasks for accessing the one or more data segments from the plurality of third-party data sources and (ii) a set of data processing tasks for processing the one or more data segments to generate a result set for the federated query. In some embodiments, the instructions, when executed by the one or more processors, additionally or alternatively cause the one or more processors to receive, using the set of data accessing tasks, the one or more data segments from the plurality of third-party data sources and quality evaluation data for the one or more data segments. In some embodiments, the instructions, when executed by the one or more processors, additionally or alternatively cause the one or more processors to generate, using the set of data processing tasks, the result set for the federated query based on the one or more data segments. In some embodiments, the instructions, when executed by the one or more processors, additionally or alternatively cause the one or more processors to generate quality metrics data for the one or more data segments based on the quality evaluation data. In some embodiments, the instructions, when executed by the one or more processors, additionally or alternatively cause the one or more processors to generate an augmented result set for the federated query based on the result set and the quality metrics data.

DETAILED DESCRIPTION

Figure 1:
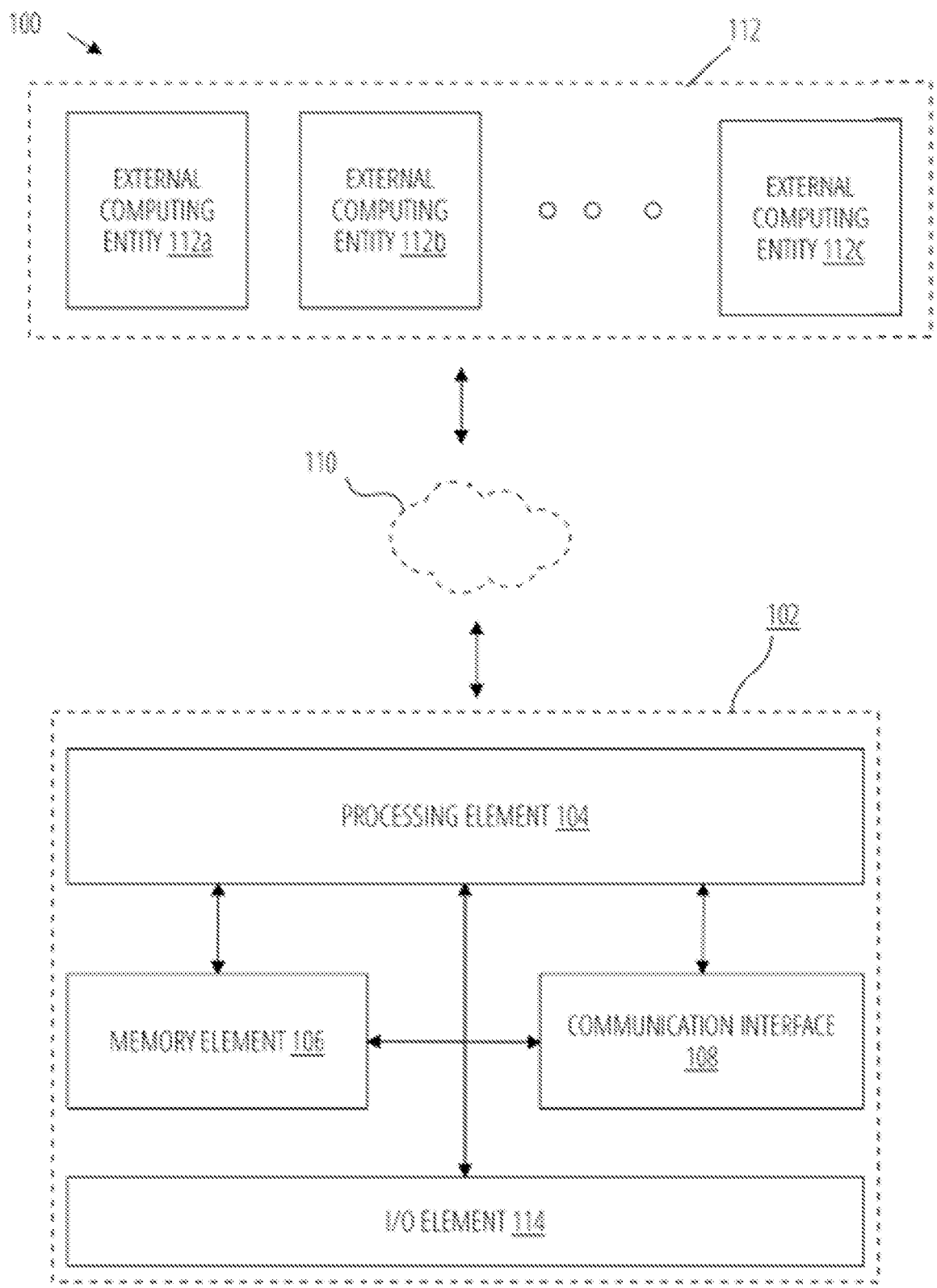
FIG. 1 illustrates an example computing system in accordance with one or more embodiments of the present disclosure.

Various embodiments of the present disclosure are described more fully hereinafter with reference to the accompanying drawings, in which some, but not all embodiments of the present disclosure are shown. Indeed, the present disclosure may be embodied in many different forms and should not be construed as limited to the embodiments set forth herein; rather, these embodiments are provided so that the present disclosure will satisfy applicable legal requirements. The term "or" is used herein in both the alternative and conjunctive sense, unless otherwise indicated. The terms "illustrative" and "example" are used to be examples with no indication of quality level. Terms such as "computing," "determining," "generating," and/or similar words are used herein interchangeably to refer to the creation, modification, or identification of data. Further, "based on," "based at least in part on," "based at least on," "based upon," and/or similar words are used herein interchangeably in an open-ended manner such that they do not necessarily indicate being based only on or based solely on the referenced element or elements unless so indicated. Like numbers refer to like elements throughout.

I. Computer Program Products, Methods, and Computing Entities

Embodiments of the present disclosure may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query, or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together, such as in a particular directory, folder, or library. Software components may be static (e.g., pre-established, or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In some embodiments, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In some embodiments, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatuses, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatuses, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some example embodiments, retrieval, loading, and/or execution may be performed in parallel such that multiple instructions are retrieved, loaded, and/or executed together. Thus, such embodiments may produce specifically-configured machines performing the steps or operations specified in the block diagrams and flowchart illustrations. Accordingly, the block diagrams and flowchart illustrations support various combinations of embodiments for performing the specified instructions, operations, or steps.

II. Example Framework

FIG. 1 illustrates an example computing system 100 in accordance with one or more embodiments of the present disclosure. The computing system 100 may include a predictive computing entity 102 and/or one or more external computing entities 112a-c communicatively coupled to the predictive computing entity 102 using one or more wired and/or wireless communication techniques. The predictive computing entity 102 may be specially configured to perform one or more steps/operations of one or more techniques described herein. In some embodiments, the predictive computing entity 102 may include and/or be in association with one or more mobile device(s), desktop computer(s), laptop(s), server(s), cloud computing platform(s), and/or the like. In some example embodiments, the predictive computing entity 102 may be configured to receive and/or transmit one or more datasets, objects, and/or the like from and/or to the external computing entities 112a-c to perform one or more steps/operations of one or more techniques (e.g., federated query processing techniques, optimization techniques, and/or the like) described herein.

The external computing entities 112a-c, for example, may include and/or be associated with one or more third-party data sources that may be configured to receive, store, manage, and/or facilitate a data catalog that is accessible to the predictive computing entity 102. By way of example, the predictive computing entity 102 may include a federated query system that is configured to access data segments from across one or more of the external computing entities 112a-c to resolve a complex, federated query. The external computing entities 112a-c, for example, may be associated with one or more data repositories, cloud platforms, compute nodes, and/or the like, that may be individually and/or collectively leveraged by the predictive computing entity 102 to resolve a federated query.

The predictive computing entity 102 may include, or be in communication with, one or more processing elements 104 (also referred to as processors, processing circuitry, digital circuitry, and/or similar terms used herein interchangeably) that communicate with other elements within the predictive computing entity 102 via a bus, for example. As will be understood, the predictive computing entity 102 may be embodied in a number of different ways. The predictive computing entity 102 may be configured for a particular use or configured to execute instructions stored in volatile or non-volatile media or otherwise accessible to the processing element 104. As such, whether configured by hardware or computer program products, or by a combination thereof, the processing element 104 may be capable of performing steps or operations according to embodiments of the present disclosure when configured accordingly.

In one embodiment, the predictive computing entity 102 may further include, or be in communication with, one or more memory elements 106. The memory element 106 may be used to store at least portions of the databases, database instances, database management systems, data, applications, programs, program modules, scripts, source code, object code, byte code, compiled code, interpreted code, machine code, executable instructions, and/or the like being executed by, for example, the processing element 104. Thus, the databases, database instances, database management systems, data, applications, programs, program modules, scripts, source code, object code, byte code, compiled code, interpreted code, machine code, executable instructions, and/or the like may be used to control certain aspects of the operation of the predictive computing entity 102 with the assistance of the processing element 104.

As indicated, in one embodiment, the predictive computing entity 102 may also include one or more communication interfaces 108 for communicating with various computing entities, e.g., external computing entities 112a-c, such as by communicating data, content, information, and/or similar terms used herein interchangeably that may be transmitted, received, operated on, processed, displayed, stored, and/or the like.

The computing system 100 may include one or more input/output (I/O) element(s) 114 for communicating with one or more users. An I/O element 114, for example, may include one or more user interfaces for providing and/or receiving information from one or more users of the computing system 100. The I/O element 114 may include one or more tactile interfaces (e.g., keypads, touch screens, etc.), one or more audio interfaces (e.g., microphones, speakers, etc.), visual interfaces (e.g., display devices, etc.), and/or the like. The I/O element 114 may be configured to receive user input through one or more of the user interfaces from a user of the computing system 100 and provide data to a user through the user interfaces.

Figure 2:
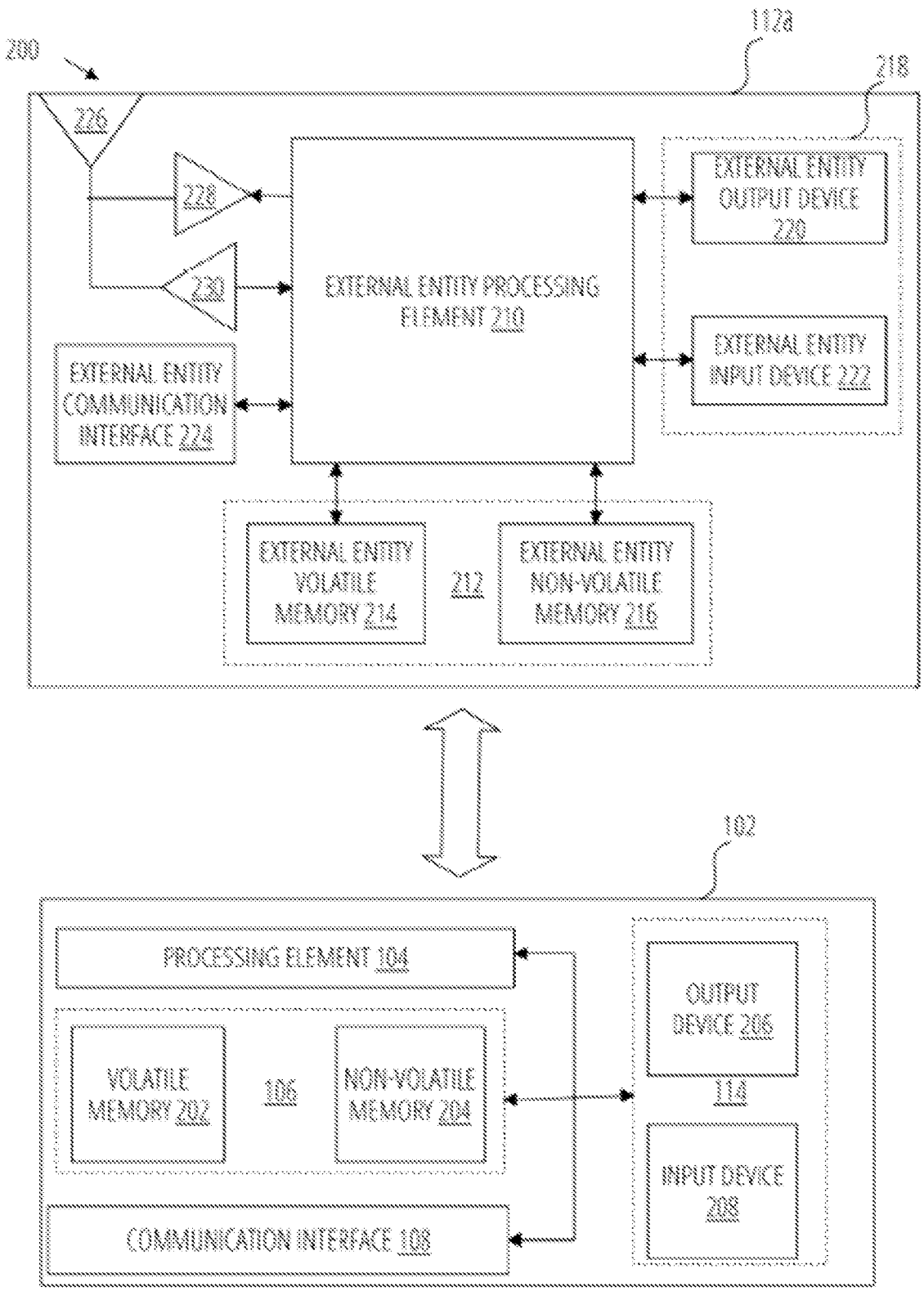
FIG. 2 is a schematic diagram showing a system computing architecture in accordance with some embodiments discussed herein.

FIG. 2 is a schematic diagram showing a system computing architecture 200 in accordance with some embodiments discussed herein. In some embodiments, the system computing architecture 200 may include the predictive computing entity 102 and/or the external computing entity 112a of the computing system 100. The predictive computing entity 102 and/or the external computing entity 112a may include a computing apparatus, a computing device, and/or any form of computing entity configured to execute instructions stored on a computer-readable storage medium to perform certain steps or operations.

The predictive computing entity 102 may include a processing element 104, a memory element 106, a communication interface 108, and/or one or more I/O elements 114 that communicate within the predictive computing entity 102 via internal communication circuitry, such as a communication bus and/or the like.

The processing element 104 may be embodied as one or more complex programmable logic devices (CPLDs), microprocessors, multi-core processors, coprocessing entities, application-specific instruction-set processors (ASIPs), microcontrollers, and/or controllers. Further, the processing element 104 may be embodied as one or more other processing devices or circuitry including, for example, a processor, one or more processors, various processing devices, and/or the like. The term circuitry may refer to an entirely hardware embodiment or a combination of hardware and computer program products. Thus, the processing element 104 may be embodied as integrated circuits, application specific integrated circuits (ASICs), field programmable gate arrays (FPGAs), programmable logic arrays (PLAs), hardware accelerators, digital circuitry, and/or the like.

The memory element 106 may include volatile memory 202 and/or non-volatile memory 204. The memory element 106, for example, may include volatile memory 202 (also referred to as volatile storage media, memory storage, memory circuitry, and/or similar terms used herein interchangeably). In one embodiment, a volatile memory 202 may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

The memory element 106 may include non-volatile memory 204 (also referred to as non-volatile storage, memory, memory storage, memory circuitry, and/or similar terms used herein interchangeably). In one embodiment, the non-volatile memory 204 may include one or more non-volatile storage or memory media, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

In one embodiment, a non-volatile memory 204 may include a floppy disk, flexible disk, hard disk, solid-state storage (SSS) (e.g., a solid-state drive (SSD)), solid state card (SSC), solid state module (SSM), enterprise flash drive, magnetic tape, or any other non-transitory magnetic medium, and/or the like. A non-volatile memory 204 may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile memory 204 may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

As will be recognized, the non-volatile memory 204 may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

The memory element 106 may include a non-transitory computer-readable storage medium for implementing one or more aspects of the present disclosure including as a computer-implemented method configured to perform one or more steps/operations described herein. For example, the non-transitory computer-readable storage medium may include instructions that when executed by a computer (e.g., processing element 104), cause the computer to perform one or more steps/operations of the present disclosure. For instance, the memory element 106 may store instructions that, when executed by the processing element 104, configure the predictive computing entity 102 to perform one or more step/operations described herein.

Embodiments of the present disclosure may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language, such as an assembly language associated with a particular hardware framework and/or operating system platform. A software component comprising assembly language instructions may require conversion into executable machine code by an assembler prior to execution by the hardware framework and/or platform. Another example programming language may be a higher-level programming language that may be portable across multiple frameworks. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query, or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together, such as in a particular directory, folder, or library. Software components may be static (e.g., pre-established, or fixed) or dynamic (e.g., created or modified at the time of execution).

The predictive computing entity 102 may be embodied by a computer program product include non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media such as the volatile memory 202 and/or the non-volatile memory 204.

The predictive computing entity 102 may include one or more I/O elements 114. The I/O elements 114 may include one or more output devices 206 and/or one or more input devices 208 for providing and/or receiving information with a user, respectively. The output devices 206 may include one or more sensory output devices, such as one or more tactile output devices (e.g., vibration devices such as direct current motors, and/or the like), one or more visual output devices (e.g., liquid crystal displays, and/or the like), one or more audio output devices (e.g., speakers, and/or the like), and/or the like. The input devices 208 may include one or more sensory input devices, such as one or more tactile input devices (e.g., touch sensitive displays, push buttons, and/or the like), one or more audio input devices (e.g., microphones, and/or the like), and/or the like.

In addition, or alternatively, the predictive computing entity 102 may communicate, via a communication interface 108, with one or more external computing entities such as the external computing entity 112a. The communication interface 108 may be compatible with one or more wired and/or wireless communication protocols.

For example, such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. In addition, or alternatively, the predictive computing entity 102 may be configured to communicate via wireless external communication using any of a variety of protocols, such as general packet radio service (GPRS), Universal Mobile Telecommunications System (UMTS), Code Division Multiple Access 2000 (CDMA2000), CDMA2000 1x (1xRTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.9 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

The external computing entity 112a may include an external entity processing element 210, an external entity memory element 212, an external entity communication interface 224, and/or one or more external entity I/O elements 218 that communicate within the external computing entity 112a via internal communication circuitry, such as a communication bus and/or the like.

The external entity processing element 210 may include one or more processing devices, processors, and/or any other device, circuitry, and/or the like described with reference to the processing element 104. The external entity memory element 212 may include one or more memory devices, media, and/or the like described with reference to the memory element 106. The external entity memory element 212, for example, may include at least one external entity volatile memory 214 and/or external entity non-volatile memory 216. The external entity communication interface 224 may include one or more wired and/or wireless communication interfaces as described with reference to communication interface 108.

In some embodiments, the external entity communication interface 224 may be supported by one or more radio circuitry. For instance, the external computing entity 112a may include an antenna 226, a transmitter 228 (e.g., radio), and/or a receiver 230 (e.g., radio).

Signals provided to and received from the transmitter 228 and the receiver 230, correspondingly, may include signaling information/data in accordance with air interface standards of applicable wireless systems. In this regard, the external computing entity 112a may be capable of operating with one or more air interface standards, communication protocols, modulation types, and access types. More particularly, the external computing entity 112a may operate in accordance with any of a number of wireless communication standards and protocols, such as those described above with regard to the predictive computing entity 102.

Via these communication standards and protocols, the external computing entity 112a may communicate with various other entities using means such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The external computing entity 112a may also download changes, add-ons, and updates, for instance, to its firmware, software (e.g., including executable instructions, applications, program modules), operating system, and/or the like.

According to one embodiment, the external computing entity 112a may include location determining embodiments, devices, modules, functionalities, and/or the like. For example, the external computing entity 112a may include outdoor positioning embodiments, such as a location module adapted to acquire, for example, latitude, longitude, altitude, geocode, course, direction, heading, speed, universal time coordinated (UTC), date, and/or various other information/data. In one embodiment, the location module may acquire data, such as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data may be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data may be determined by triangulating a position of the external computing entity 112a in connection with a variety of other systems, including cellular towers, Wi-Fi access points, and/or the like. Similarly, the external computing entity 112a may include indoor positioning embodiments, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops), and/or the like. For instance, such technologies may include the iBeacons, Gimbal proximity beacons, Bluetooth Low Energy (BLE) transmitters, NFC transmitters, and/or the like. These indoor positioning embodiments may be used in a variety of settings to determine the location of someone or something to within inches or centimeters.

The external entity I/O elements 218 may include one or more external entity output devices 220 and/or one or more external entity input devices 222 that may include one or more sensory devices described herein with reference to the I/O elements 114. In some embodiments, the external entity I/O element 218 may include a user interface (e.g., a display, speaker, and/or the like) and/or a user input interface (e.g., keypad, touch screen, microphone, and/or the like) that may be coupled to the external entity processing element 210.

For example, the user interface may be a user application, browser, and/or similar words used herein interchangeably executing on and/or accessible via the external computing entity 112a to interact with and/or cause the display, announcement, and/or the like of information/data to a user. The user input interface may include any of a number of input devices or interfaces allowing the external computing entity 112a to receive data including, as examples, a keypad (hard or soft), a touch display, voice/speech interfaces, motion interfaces, and/or any other input device. In embodiments including a keypad, the keypad may include (or cause display of) the conventional numeric (0-9) and related keys (#, *, and/or the like), and other keys used for operating the external computing entity 112a and may include a full set of alphabetic keys or set of keys that may be activated to provide a full set of alphanumeric keys. In addition to providing input, the user input interface may be used, for example, to activate or deactivate certain functions, such as screen savers, sleep modes, and/or the like.

III. Examples of Certain Terms

In some embodiments, the term "first party" refers to a computing entity that is associated with a query-based action. The first party may include a computing system, platform, and/or device that is configured to initiate a query to one or more third-party data sources. For example, the first party may include first-party platform that is configured to leverage data from one or more disparate data sources to perform a computing action. The first-party platform may include a machine learning processing platform configured to facilitate the performance of one or machine learning models, a data processing platform configured to process, monitor, and/or aggregate large datasets, and/or the like. To improve computing efficiency and enable the aggregation of data across multiple disparate datasets, the first party may generate federated queries that reference datasets from multiple third parties and submit the federated queries to one intermediary query processing service configured to efficiently receive the queried data from the third parties and return the data to the first party. In some examples, the first party may have access to a query routine set (e.g., software development kit (SDK), etc.) that may be leveraged to wrap a query submission, acknowledgment, status polling, and result fetching application programming interfaces (APIs) to deliver a synchronous experience between the first party and the intermediary query processing service.

In some embodiments, the term "third-party data source" refers to a data storage entity configured to store, maintain, and/or monitor a data catalog. A third-party data source may include a heterogenous data store that is configured to store a data catalog using specific database technologies, such as Netezza, Teradata, and/or the like. A data store, for example, may include a data repository, such a database, and/or the like, for persistently storing and managing collections of structured and/or unstructured data (e.g., catalogs, etc.). A third-party data source may include an on-premise data store including one or more locally curated data catalogs. In addition, or alternatively, a third-party data source may include a remote data store including one or more cloud-based data lakes, such as Vulcan, Level2, and/or the like. In some examples, a third-party data source may be built on specific database technologies that may be incompatible with one or more other third-party data sources. Each of the third-party data sources may define a data catalog that, in some use cases, may include data segments that could be aggregated to perform a computing task.

In some embodiments, the term "federated query system" refers to a computing entity that is configured to perform an intermediary query processing service between a first party and a plurality third-party data sources. The federated query system may define a single point of consumption for a first party. The federated query system may leverage a federated query engine to enable analytics by querying data where is it is maintained (e.g., third-party data sources, etc.), rather than building complex extract, transform, and load (ETL) pipelines.

In some embodiments, the term "federated query" refers to a data entity that represents a query to a plurality of disparate, third-party data sources. The federated query may include a logical query statement that defines a plurality of query operations for receiving and processing data from multiple, different, third-party data sources.

In some embodiments, the term "result set" refers to a data entity that represents a result generated by resolving a federated query. A result set may include a dataset that includes information aggregated from one or more third-party data sources in accordance with a federated query. For example, the result set may include one or more data segments, such as one or more columns, tables, and/or the like, from one or more third-party data sources. The data segments may be joined, aggregated, and/or otherwise processed to generate a particular result set.

In some embodiments, the term "data segment" refers to a portion of a third-party computing source. A data segment, for example, may include a segment of a data catalog corresponding to a third-party computing resource. In some examples, a data segment may include a data table stored by a third-party data source. In addition, or alternatively, the data segment may include a portion of the data table. By way of example, the data segment may include one or more index ranges, columns, rows, and/or combinations thereof of a third-party data source.

In some embodiments, the term "syntax tree" refers a data entity that represents a parsed federated query. A syntax tree may include a tree data structure, such as directed acyclic graph (DAG), and/or the like, that includes a plurality of nodes and a plurality of edges connecting one or more of the plurality of nodes. Each of the plurality of nodes may correspond to a query operation for executing a federated query. The plurality of edges may define a sequence for executing each query operation represented by the plurality of nodes. By way of example, a federated query may be parsed to extract a plurality of interdependent query operations from a federated query. The plurality of interdependent query operations may include computing functions that may rely on an input from a previous computing function and/or provide an input to a subsequent computing function. As one example, a first, data scan, function may be performed to retrieve a data segment before a second, data join, function is performed using the data segment. The syntax tree may include a plurality of nodes and/or edges that define the query operations (e.g., the nodes) and the relationships (e.g., the edges) between each of the query operations of a federated query.

In some embodiments, the term "query operation" refers a data entity that represents a portion of a federated query. A query operation may include data expression, such a structured query language (SQL) expression, that may represent a primitive computing task for executing a portion of a federated query. A query operation, for example, may include a search/scan operation for receiving data from a third-party data source, a join operation for joining two data segments, and/or the like.

In some embodiments, the term "execution plan" refers to a data entity that represents an optimized plan for executing a federated query. The execution plan, for example, may include a plurality of executable tasks for generating a result set from a plurality of third-party data sources. The execution plan may be generated by a federated query engine in accordance with an execution strategy. The execution strategy may be designed to optimize the resolution of a federated query by breaking the federated query into a plurality of serializable units of work (e.g., compute tasks) that may be distributed among one or more compute nodes.

In some examples, a federated query is converted to a syntax tree to define each of the query operations of the federated query and the relationships therebetween. The syntax tree may be converted to a logical plan in the form of hierarchical nodes that denote the flow of input from various sub-nodes. The logical plan may be optimized using one or more optimization techniques, to generate an execution plan in accordance with an execution strategy. The optimization techniques may include any type of optimization function including, as examples, Predicate and Limit pushdown, Column-Pruning, Join re-ordering, Parallelization, and/or other cost-based optimization techniques. The portions (e.g., executable tasks) of the execution plan may be scheduled across distinct compute nodes to be performed in parallel to generate intermediate result sets. Each compute node, for example, may individually connect to one or more third-party data sources to execute at least one executable task of the execution plan. The execution of each executable task may generate intermediate results. The intermediate results from each executable task may be transferred to one compute node to generate a result set.

In some embodiments, the term "executable task" refers to a data entity that represents a portion of an execution plan. An executable task may represent a unit of work for a compute node to perform a portion of a federated query. By way of example, an executable task may include one or more query operations for performing a portion of the federated query.

In some embodiments, the term "data accessing task" refers to a data entity that represents a type of executable task. A data accessing task may represent a unit of work for a compute node to perform a portion of a federated query. A data accessing task, for example, may include one or more data access operations for accessing data from one or more data sources (e.g., third-party data sources, etc.) for performing a portion of the federated query. By way of example, data access operations may include one or more searching, scanning, and/or the like operations that, when executed, retrieve a data segment from a third-party data source.

In some embodiments, the term "data processing task" refers to a data entity that represents a type of executable task. A data processing task may represent a unit of work for a compute node to perform a portion of a federated query. A data processing task, for example, may include one or more data processing operations related to one or more data segments for performing a portion of the federated query. By way of example, the data processing operations may include one or more data aggregation, data augmentation, data sorting, data filtering, data analytics, and/or the like operations that, when executed, manipulate, augment, and/or otherwise process data segments received through one or more prior data accessing tasks.

In some embodiments, the term "quality evaluation data" refers to a data entity that represents predefined quality attributes, values, thresholds, and/or the like for a data segment of a data source. The quality evaluation data may be indicative of contextual data for determining quality metrics related to data segments. In some examples, quality evaluation data is indicative of one or more quality metric values for one or more data segments, timestamp data for a previous update to the one or more data segments, a type of quality metric defined for one or more data segments, and/or other quality evaluation information related to one or more data segments.

In some embodiments, the term "quality metrics data" refers to a data entity that represents one or more quality metrics for one or more data segments accessed and/or processed according to a federated query. The quality metrics data may be determined using the quality evaluation data. In some examples, the quality metrics data is related to accuracy, timeliness, completeness, consistency, validation, uniqueness, and/or the like for one or more data segments accessed and/or processed according to a federated query. By way of example, the quality metrics data may include an accuracy metric for predicting an accuracy of the data within a particular data segment, a timeliness metric for predicting timeliness of the data within a particular data segment, a completeness metric for predicting completeness of the data within a particular data segment, a consistency metric for predicting consistency of the data within a particular data segment, a validation metric for predicting validation of the data within a particular data segment, and/or a uniqueness metric for predicting uniqueness of the data within a particular data segment.

In one example, the accuracy metric may predict whether the data is within predefined limits, whether a relationship between the data and other data in the particular data segment satisfies accuracy criteria, whether a distribution of data including the data in the particular data segment satisfies accuracy criteria, etc. In another example, the timeliness metric may predict whether a timestamp for the data is within a particular interval of time with respect to other data within the particular data segment, etc. In yet another example, the validation metric may predict whether a data format for the data within the particular data segment conforms to one or more data standards for the particular data segment and/or other data within the particular data segment.

In some examples, one or more of these metrics may be derived from quality evaluation data. For example, the accuracy metric may be based on timestamp data (e.g., a predictive accuracy may increase for recent updates and decrease for less recent updates, etc.), the timeliness metric may be based on a comparison of timestamp data to one or more timing criteria of the quality evaluation data, etc.

In some embodiments, the term "intermediary local data source" refers to a data storage entity configured to store, maintain, and/or monitor portions of one or more third-party data sources. An intermediary local data source may include a local data store, such a local cache, and/or the like, that is configured to temporarily store one or more result sets from one or more federates queries. By way of example, the intermediary local data source may include one or more cache memories, each configured store and/or maintain a result dataset for a temporary time duration. In some examples, the intermediary local data source may be configured with one or more time intervals that specify a refresh rate, time-to-live, and/or the like for data stored within the intermediary local data source.

In some embodiments, the term "federated query attribute" refers to a data entity that describes a characteristic of a federated query. A federated query attribute may be indicative of a feature, a characteristic, a property, or another type of attribute for a federated query. In some examples, a federated query attribute may be indicative of a feature, a characteristic, a property, or another type of attribute for metadata and/or a data payload of a federated query. In some examples, one or more federate query attributes may be utilized to access and/or determine one or more portions of quality evaluation data related to a federated query.

In some examples, a federated query attribute may be indicative of a historical access frequency for one or more data segments and/or one or more third-party data sources referenced by a federated query. The historical access frequency may be indicative of one or more access patterns for one or more data segments and/or one or more third-party data sources. By way of example, the historical access frequency may be indicative of a query count for one or more data segments and/or one or more third-party data sources. The query count may be indicative of a number of federated queries that access data from one or more data segments and/or one or more third-party data sources over a period of time.

In some examples, a federated query attribute may be indicative of a query complexity for resolving a corresponding federated query. A query complexity may be based on a syntax tree, one or more query operations, an execution plan, one or more executable tasks, and/or the like. For example, the query complexity may be based on one or more historical executable times or processing resource requirements for executing one or more portions (e.g., query operations, executable tasks, etc.) of a federated query. In some examples, the query complexity may be based one or more third-party data sources associated with a federated query. For example, the query complexity may be based on one or more access rates, access latencies, and/or the like for the third-party data sources.

In some examples, a federated query attribute may include a data consumer threshold corresponding to the first party that initiated the federated query. For example, the data staleness threshold may be based on an execution frequency, one or more data integrity requirements, and/or the like, of an application configured to leverage one or more data segments and/or one or more third-party data sources referenced by a federated query.

IV. Overview, Technical Improvements, and Technical Advantages

Various embodiments of the present disclosure addresses technical challenges related to traditional federated query engines. Traditional federated query engines typically generate result datasets by repeatedly pulling data segments from disparate remote data sources to resolve a complex federated query. For example, data assets are often stored on disparate on-premise data stores built using disparate database technologies. These on-premise data stores are not easily integrated with other data storage architectures, such as cloud data lake architectures. Additionally, multiple copies of data stored in the disparate data stores may cause consistency, governance, and/or maintenance overhead for the data. As such, resolving federated queries using existing federated query engines may be time consuming and/or resource intensive. Moreover, traditional federated query engines typically rely on third-party data sources to determine quality of data related to data queries and/or to asynchronously determine data quality metrics related to data queries. As a result, inefficient usage of computing resources for a traditional federated query engine may occur and/or the determined data quality metrics may be disassociated from the actual data being queried. This ultimately results in data quality metrics that are inaccurate, out of date, and/or otherwise unrepresentative of the true quality of queried datasets.

To address these and/or other technical challenges related to traditional federated query engines, embodiments of the present disclosure present federated query processing techniques that improve traditional federated query engines by providing quality evaluation and/or augmentation of data provided by a federated query system. In various embodiments, on-demand data quality evaluation may be provided such that improved data analytics and/or data science processing of the data may be realized. The on-demand data quality evaluation may additionally provide improved querying and/or analysis of data across disparate remote data sources without generating duplicate copies of the data. In various embodiments, the federated query processing techniques may be leveraged to automatically generate quality metrics for a dataset in response to a query. Additionally, the federated query processing techniques may be leveraged to provide the quality metrics with a query response. In some embodiments, the federated query system receives a query referencing a dataset. In response to the query, the federated query system may identify quality criteria for the dataset, generate one or more quality metrics for the dataset based on the quality criteria, and/or augment the query results with the one or more quality metrics.

The federated query processing techniques may additionally or alternatively be leveraged to provide parallel data quality assessments that may be performed while a query is being resolved. The parallel data quality assessments may enable a more targeted approach for maintaining data quality by assessing a dataset, on demand, when access to the dataset is requested. Quality metrics may then be correlated with the results of the query to provide a holistic query result that identifies potentially corrupt or out of date data. For example, the holistic query result may provide the queried data (e.g., metadata of the query) with data quality metrics corresponding to the data. The quality criteria for the dataset may include specific quality metrics corresponding to the dataset, a last update to the dataset, a recommendation of whether the quality of the dataset should be reassessed, and/or other quality criteria. Additionally, the generation of the quality metrics may be performed in response to the query, as opposed to a traditional asynchronous schedule for a data store.

In some embodiments, a query may be received via an API gateway of the federated query system. In some embodiments, the query may be received from a client device. The query may then be routed to a web service of the federated query system that exposes APIs for submitting queries and/or retrieving query statuses. The federated query system may store the request in a queue for subsequent processing after validating fair usage quotas, permissions, costs, idempotency checks, and/or other information. Moreover, the federated query system may be configured for executing and/or monitoring queries. For example, the federated query system may receive the queued request through event triggers. The federated query system may also analyze the shape of the query (e.g., query pattern, etc.) and/or determine a particular query engine to handle the query. The federated query system may then submit the query to either a first federated query engine or a second federated query engine (e.g., a cloud federated query engine or an on-premise federated query engine). Results of the queries may be persisted as materialized data for consumption via a user interface and/or a physical location of the materialized data may be saved as metadata of the query so that the federated query system may transmit storage details to client devices for direct storage access.

In doing so, various embodiments of the present disclosure address shortcomings of existing federated query solutions and enable solutions that are capable of efficiently and reliably querying data from disparate data sources. For example, federated queries may be resolved in a shorter amount of time and/or by utilizing fewer computing resources as compared to existing federated query solutions. Example inventive and technologically advantageous embodiments of the present disclosure additionally include improved data analytics and/or machine learning with respect to data from disparate data sources. Example inventive and technologically advantageous embodiments of the present disclosure additionally include improved quality of data obtained from disparate data sources (e.g., improved consistency, governance, and/or maintenance overhead for data).

Additionally, computing resource allocation for a federated query systems may be improved by integrating data quality assessment with query processing. In this regard, example inventive and technologically advantageous embodiments of the present disclosure include (i) on-demand data quality assessment schemes for assessing data in response to queries to the data to provide quality metrics tailored to the data of a federated query, (ii) improved utilization of query downtime for a federated query system by combining evaluation functions with real-time query operations to simultaneously assess a dataset while resolving a federated query, (iii) improved data visualizations for visualizing queried data in the context of predicted accuracy for the queried data, among other advantages.

V. Example System Operations

As indicated, various embodiments of the present disclosure make important technical contributions to federated query processing technology. In particular, systems and methods are disclosed herein that implement federated query processing techniques for evaluating quality and/or augmenting data related to federated queries. Unlike traditional query techniques, the query processing techniques of the present disclosure leverage execution plans and quality evaluation techniques to generate augmented results for federated queries.

Figure 3:
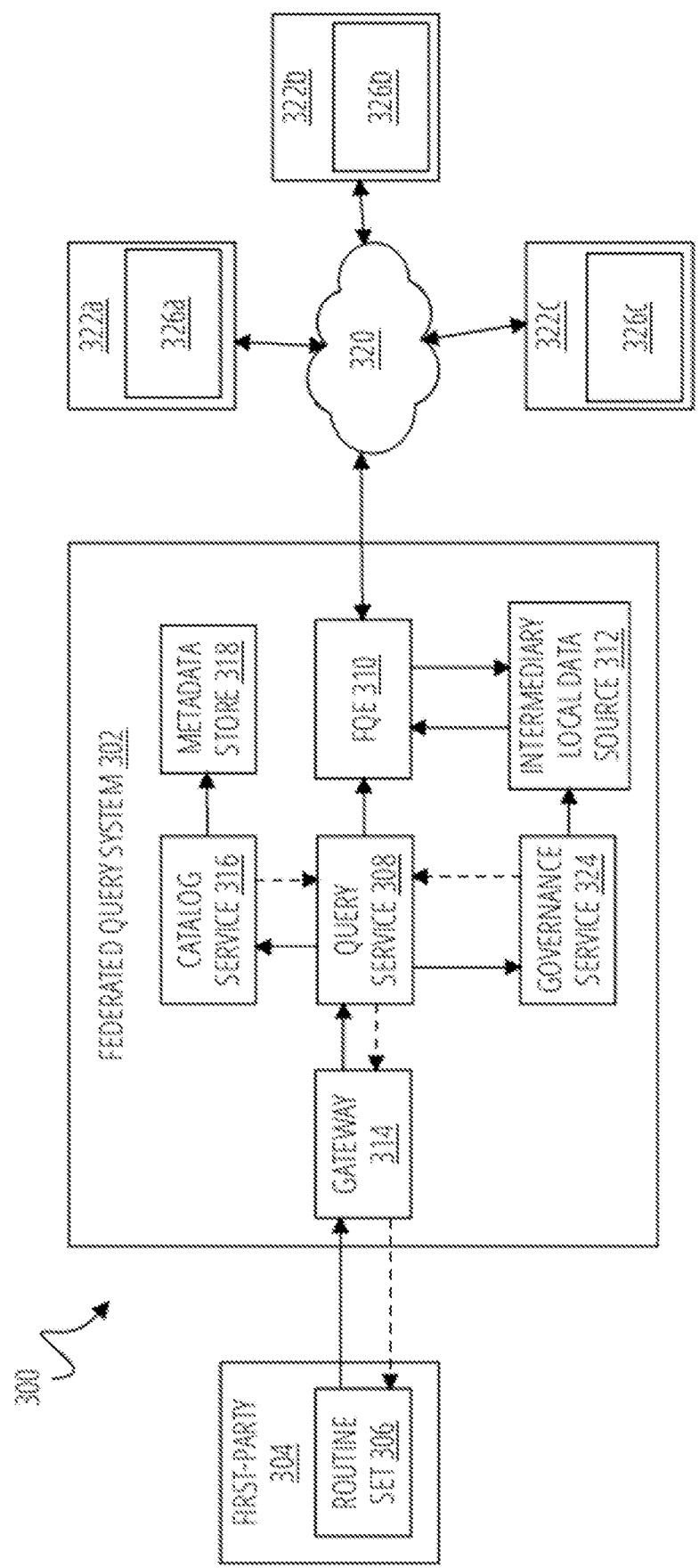
FIG. 3 is a system diagram showing example computing entities for facilitating a federated query service in accordance with some embodiments discussed herein.

FIG. 3 is a system diagram 300 showing example computing entities for facilitating a federated query service in accordance with some embodiments discussed herein. The system diagram 300 includes a first party 304, a federated query system 302, and a plurality of third-party data sources 322a-c. The federated query system 302 may be configured to facilitate a plurality of computing functionalities to provide a seamless experience for the first party 304, such as a data analytics and/or science user, to query and analyze data across the plurality of third-party data sources 322a-c without the need make duplicate copies of the data. Using some of the techniques of the present disclosure, the federated query system 302 optimizes data store coverage, speed of analytics, and correctness of data to provide a near real time experience for all analytical use cases.

In some embodiments, the federated query system 302 is a computing entity that is configured to perform an intermediary query processing service between the first party 304 and the plurality of third-party data sources 322a-c. The federated query system 302 may define a single point of consumption for a first party 304. The federated query system 302 may leverage a federated query engine to enable analytics by querying data where is it is maintained (e.g., third-party data sources, etc.), rather than building complex ETL pipelines.

In some embodiments, the first party 304 accesses the federated query system 302 to initiate a federate query to one or more of the plurality of third-party data sources 322*a-c*. For example, the first party 304 may leverage a routine set 306 for the federated query system 302 to submit a federated query to the federated query system 302. The federated query system 302 may include an application programming interface (API) gateway 314 for securely receiving the federated query. The gateway 314 may verify and/or route the federated query to the query service 308.

In some embodiments, the first party 304 is a computing entity that is associated with a query-based action. The first party may include a computing system, platform, and/or device that is configured to initiate a query to one or more of the plurality of third-party data sources 322*a-c*. For example, the first party 304 may include a first party platform that is configured to leverage data from one or more disparate data sources to perform a computing action. The first party platform may include a machine learning processing platform configured to facilitate the performance of one or machine learning models, a data processing platform configured to process, monitor, and/or aggregate large datasets, and/or the like.

To improve computing efficiency and enable the aggregation of data across multiple disparate datasets, the first party 304 may generate a federated query that reference datasets from multiple third parties and submit the federated query to one intermediary query processing service (e.g., federated query system 302) configured to efficiently receive the queried data from the third parties and return the data to the first party 304. In some examples, the first party 304 may have access to a query routine set (e.g., software development kit (SDK), etc.) that may be leveraged to wrap a query submission, acknowledgment, status polling, and/or result fetching APIs to deliver a synchronous experience between the first party 304 and the intermediary query processing service.

In some embodiments, a federated query is a data entity that represents a query to a plurality of third-party data sources 322*a-c*. The federated query may include a logical query statement that defines a plurality of query operations for receiving and processing data from multiple, different, third-party data sources 322*a-c*. In some examples, the federated query may be generated using one or more query functionalities of the routine set 306.

In some embodiments, a query operation is a data entity that represents a portion of a federated query. A query operation may include data expression, such a structured query language (SQL) expression, that may represent a primitive computing task for executing a portion of a federated query. A query operation, for example, may include a search/scan operation for receiving data from a third-party data source, a join operation for joining two data segments, and/or the like.

In some embodiments, a third-party data source is a data storage entity configured to store, maintain, and/or monitor a data catalogue. A third-party data source may include a heterogenous data store that is configured to store a data catalogue using specific database technologies, such as Netezza, Teradata, and/or the like. A data store, for example, may include a data repository, such a database, and/or the like, for persistently storing and managing collections of structured and/or unstructured data (e.g., catalogues, etc.). A third-party data source may include an on-premise data store including one or more locally curated data catalogues. In addition, or alternatively, a third-party data source may include a remote data store including one or more cloud-based data lakes, such as Vulcan, Level2, and/or the like. In some examples, a third-party data source may be built on specific database technologies that may be incompatible with one or more other third-party data sources. Each of the third-party data sources may define a data catalogue that, in some use cases, may include data segments that could be aggregated to perform a computing task.

By way of example, the federated query system 302 may be associated with a plurality of third-party data sources 322*a-c* that may include a first third-party data source 322*a*, a second third-party data source 326*b*, a third third-party data source 322*c*, and/or the like. Each of the plurality of third-party data sources 322*a-c* may include a standalone, incompatible, data sources. The first third-party data source 322*a*, for example, may include a first third-party dataset 326*a* that is separate from a second third-party data source 326*b* and/or a third third-party dataset 326*c* of the second third-party data source 322*b* and third third-party data source 322*c*, respectively. Each of the plurality of third-party data sources 322*a-c* may include any type of data source. As an example, the first third-party data sources 322*a* may include a first cloud-based dataset, the second third-party data source 322*b* may include an on-premises dataset, the third third-party data source 322*c* may include a second cloud-based dataset, and/or the like.

In some embodiments, the query service 308 receives a federated query from the first party 304 through the gateway 314. The federated query may reference one or more data segments from the plurality of third-party data sources 322*a-c*. A data segment may be a portion of a respective third-party computing source of the plurality of third-party data sources 322*a-c*. The query service 308 may perform one or more operations to facilitate the optimal generation of a result set in response to the federated query. To do so, the query service 308 may leverage one or more sub-components of the federated query system 302. The one or more sub-components may include the federated query engine 310, the catalog service 316, the governance service 324, the intermediary local data source 312, the metadata store 318, and/or the like.

In some embodiments, the federated query engine 310 is a computing entity that is configured to execute federated query across heterogenous data store technologies. The federated query engine 310 may be configured to implement an execution strategy to generate an optimal execution plan for a federated query. The execution plan may define a sequence of operations, a timing for the sequence of operations, and/or other contextual information for optimally executing a complex federated query. The federated query engine 310, may leverage optimization techniques, such as Predicate and Limit pushdown, Column-Pruning, Join re-ordering, Parallelization, and/or other cost-based optimization techniques to arrive at an execution strategy of the joins, aggregations, and/or the like.

The federated query engine 310 may be configured to leverage a massively parallel processing (MPP) architecture to simultaneously execute multiple portions of a federated query to optimize computing performance. For example, the federated query engine 310 may schedule one or more portions of the execution plan for execution across one or more distinct compute nodes which then connect to the plurality of third-party data sources 322*a-c* to execute parts of splits of the execution plan on the plurality of third-party data sources 322a-c. In this manner, a result set may be generated across multiple compute nodes and then transferred back to the executor (worker) nodes which processes intermediate results.

In some embodiments, the catalog service 316 is a computing entity that is configured to identify a mapping between a data segment and a third-party data source. For example, the catalog service 316 may maintain a table name path for each data table associated with (e.g., registered with, etc.) the federated query system 302. By way of example, the plurality of third-party data sources 322a-c may be previously registered with the federated query system 302. During registration, the catalog service 316 may be modified to include a mapping to each data table of a respective data catalog of a third-party data source. The mapping may include a table name path that identifies a path for accessing a particular table of a third-party data source.

In some embodiments, a table name path is a data entity that represents a qualifiable table name for a data table. A table name path, for example, may identify a third-party data source, a schema, and/or a table name for the data table. The table name may include a third-party defined name. In some examples, the table name may correspond to one or more table name aliases defined by the third-party and/or one or more other entities. The catalog service 316 may record the table name path, the table name, and/or any table name aliases for a respective data table.

In some examples, the mapping for a respective data table may be modifiable to redirect a request to a data table. For instance, the catalog service 316 may be configured to communicate with the plurality of third-party data sources 322a-c to maintain a current mapping for each data table of the plurality of third-party data sources 322a-c. In addition, or alternatively, the catalog service 316 may interact with the query service 308 to redirect a request to a data table, and/or portion thereof, to an intermediate local data source as described herein.

In some embodiments, the catalog service 316 maintains a metadata store 318 that includes metadata for each of the plurality of third-party data sources 322a-c. The metadata store 318 may be populated for each of the plurality of third-party data sources 322a-c during registration. The metadata may include access parameters (e.g., security credentials, data access controls, etc.), performance attributes (e.g., historical latency, data quality, etc.), access trends, quality evaluation data, and/or the like for each of the plurality of third-party data sources 322a-c.

In some examples, the catalog service 316 may maintain a current state for a federated query system 302. The current state may be indicative of a plurality of historical result set hashes corresponding to a plurality of recently resolved federated queries and/or one or more query counts for each of the historical result set hashes. In some examples, the plurality of historical result set hashes may identify one or more locally stored result sets that are currently stored in one or more intermediary local data sources 312.

In some embodiments, the federated query system 302 includes a governance service 324 configured to manage access to the intermediary local data source 312. The governance service 324, for example, may include a computing entity that is configured to authorize and/or audit access to one or more local and/or remote data assets. The governance service 324 may define governance criteria for data classification, usage rights, and/or access controls to intermediary local data source 312 and/or the plurality of third-party data sources 322a-c.

In some embodiments, the intermediary local data source 312 refers to a data storage entity configured to store, maintain, and/or monitor portions of the plurality of third-party data sources 322a-c. An intermediary local data source 312 may include a local data store, such a local cache, and/or the like, that is configured to temporarily store one or more data segments from one or more of the plurality of third-party data sources 322a-c. By way of example, the intermediary local data source 312 may include one or more cache memories, each configured store and/or maintain a data segment and/or a result dataset for a temporary time duration. In some examples, the intermediary local data source 312 may be leveraged with one or more optimization techniques of the present disclosure to intelligently retrieve and store result sets for unique federated queries.

In some embodiments, the query service 308 is configured to facilitate quality analysis and/or augmentation of result sets, from unique federated queries, within the intermediary local data source 312. An example of a data quality evaluation scheme will now further be described with reference to FIG. 4.

Figure 4:
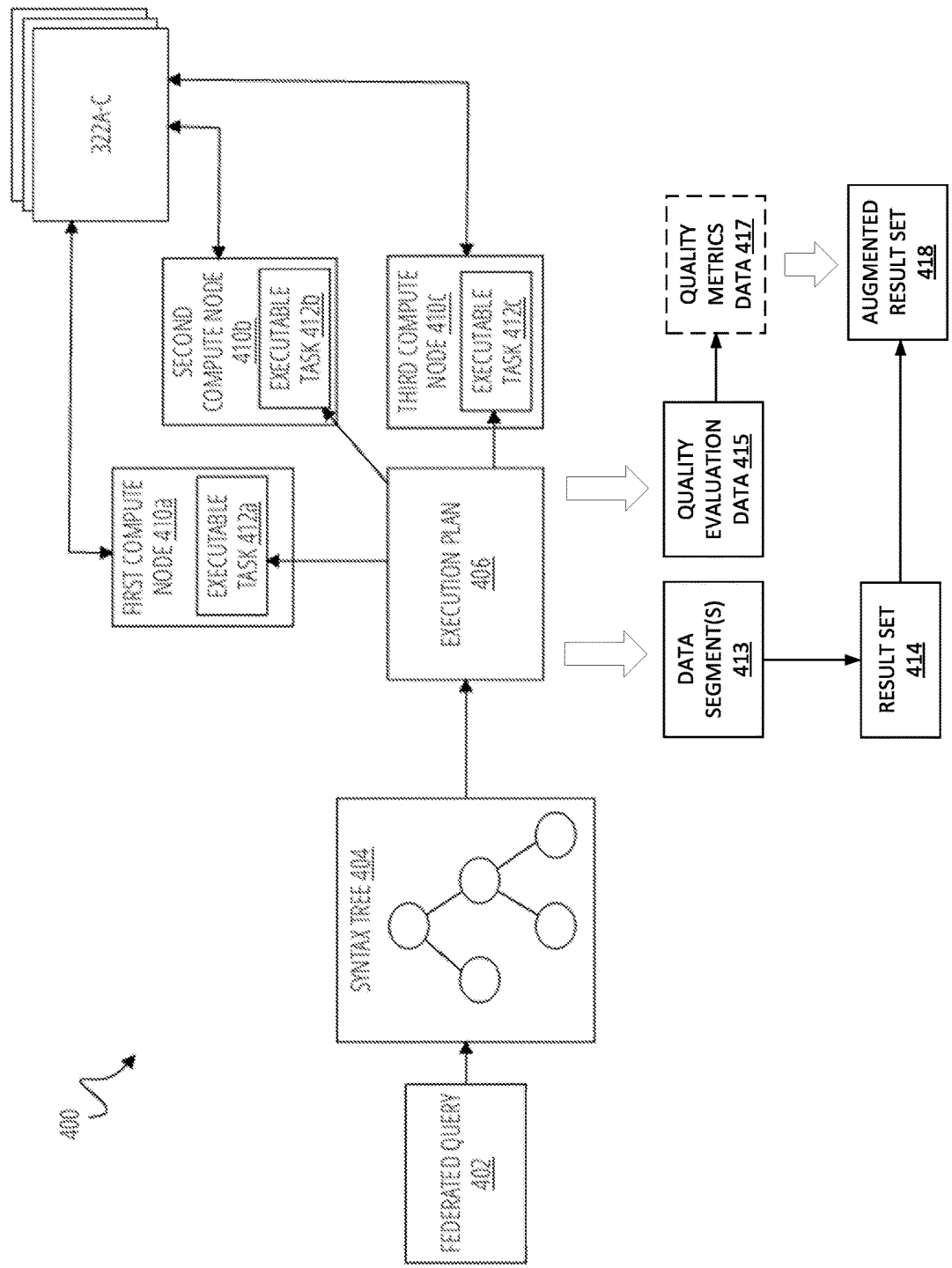
FIG. 4 is a dataflow diagram showing example data structures for providing quality analysis and/or augmentation of data in accordance with some embodiments discussed herein.

FIG. 4 is a dataflow diagram 400 showing example data structures for providing quality analysis and/or augmentation of data in accordance with some embodiments discussed herein. The dataflow diagram 400 depicts a set of data structures and computing entities for optimally resolving a federated query across a plurality of third-party data sources 322a-c using an execution plan 406 with a plurality of parallelizable executable tasks 412a-c.

In some embodiments, a federated query 402 is received that references a plurality of data segments from one or more of the plurality of third-party data sources 322a-c. For example, each of the data segments may be referenced by one or more query operations of the federated query 402. In some embodiments, the federated query 402 is received via the gateway 314 of the federated query system 302 communicatively coupled to the third-party data sources 322a-c. In some embodiments, the gateway 314 is configured as an API gateway. For instance, the federated query 402 may be received via one or more APIs of the gateway 314.

In some embodiments, a data segment is a portion of a third-party computing source. A data segment, for example, may include a segment of a data catalog corresponding to a third-party computing resource. In some examples, a data segment may include a data table stored by a third-party data source. In addition, or alternatively, the data segment may include a portion of the data table. By way of example, the data segment may include one or more index ranges, columns, rows, and/or combinations thereof of a third-party data source.

In some embodiments, the federated query 402 is resolved to generate a result set 414. In some embodiments, the result set 414 is a data entity that represents a result generated by resolving a federated query 402. A result set 414 may include a dataset that includes information aggregated from one or more of a plurality of third-party data sources 322a-c in accordance with a federated query 402. For example, the result set 414 may include one or more data segments 413, such as one or more columns, tables, and/or the like, from one or more of the third-party data sources 322a-c. The data segments 413 may be joined, aggregated, and/or otherwise processed to generate a particular result set.

The federated query 402 may be resolved in accordance with an execution plan 406 for the federated query 402. For example, the execution plan 406 may be received, determined, and/or otherwise utilized for the federated query 402. The execution plan 406 may include a plurality of executable tasks 412a-c for resolving the federated query 402. For instance, the execution plan may include the plurality of executable tasks 412a-c for generating a result set 414 from the plurality of third-party data sources 322a-c.

In some embodiments, the execution plan 406 may be received from a federated query engine. For example, a query service may receive the federated query 402 and provide the federated query 402 to the federated query engine for processing. The federated query engine may, in response to the federated query 402, generate the execution plan 406 in accordance with an optimized execution strategy and provide the execution plan 406 for the federated query 402 to the query service.

In some embodiments, the execution plan 406 is a data entity that represents an optimized plan for executing a federated query 402. The execution plan 406 may be generated by a federated query engine in accordance with an execution strategy. The execution strategy may be designed to optimize the resolution of a federated query 402 by breaking the federated query 402 into a plurality of serializable units of work (e.g., executable tasks 412a-c) that may be distributed among one or more compute nodes 410a-c.

In some examples, the execution plan 406 is generated based on a syntax tree 404 for the federated query 402. For instance, the federated query 402 may be converted to the syntax tree 404 to define each of the query operations of the federated query 402 and the relationships therebetween.

In some embodiments, the syntax tree 404 is a data entity that represents a parsed federated query. The syntax tree 404 may include a tree data structure, such as directed acyclic graph (DAG), and/or the like, that includes a plurality of nodes and a plurality of edges connecting one or more of the plurality of nodes. Each of the plurality of nodes may correspond to a query operation for executing at least a portion of the federated query 402. The plurality of edges may define a sequence for executing each query operation represented by the plurality of nodes. By way of example, the federated query 402 may be parsed to extract a plurality of interdependent query operations from the federated query 402. The plurality of interdependent query operations may include computing functions that may rely on an input from a previous computing function and/or provide an input to a subsequent computing function. As one example, a first, data scan, function may be performed to retrieve a data segment from a third-party data source before a second, data join, function is performed using the data segment. The syntax tree 404 may include a plurality of nodes and/or edges that define the query operations (e.g., the nodes) and the relationships (e.g., the edges) between each of the query operations of the federated query 402.

In some embodiments, the syntax tree 404 is converted to a logical plan in the form of hierarchical nodes that denote the flow of input from various sub-nodes. The logical plan may be optimized, using one or more optimization techniques, to generate an execution plan 406 in accordance with an execution strategy. The optimization techniques may include any type of optimization function including, as examples, Predicate and Limit pushdown, Column-Pruning, Join re-ordering, Parallelization, and/or other cost-based optimization techniques. The portions (e.g., executable tasks 412a-c) of the execution plan 406 may be scheduled across distinct compute nodes 410a-c to be performed in parallel to generate intermediate result sets. Each of the compute nodes 410a-c, for example, may individually connect to one or more of the plurality of third-party data sources 322a-c to execute at least one executable task of the execution plan 406. The execution of each executable task may generate intermediate results. The intermediate results from each execution task may be transferred to one compute node to generate the result set 414.

In some embodiments, an executable task is a data entity that represents a portion of an execution plan 406. An executable task may represent a unit of work for a compute node to perform a portion of a federated query 402. By way of example, an executable task may include one or more query operations for performing a portion of the federated query 402.

In some embodiments, to optimize the resolution of a federated query 402, an execution plan 406 is split into multiple independently executable tasks 412a-c. By way of example, the executable tasks 412a-c may include a first executable task 412a, a second executable task 412b, a third executable task 412c, and/or the like. Each of the executable tasks 412a-c may be individually scheduled across a plurality of compute nodes 410a-c. For example, the first executable task 412a may be scheduled for execution by a first compute node 410a, the second executable task 412b may be scheduled for execution by a second compute node 410b, the third executable task 412c may be scheduled for execution by a third compute node 410c, and/or the like.

In some embodiments, the plurality of executable tasks 412a-c respectively include one or more data accessing tasks and/or one or more data processing tasks.

A data accessing task may include one or more executable tasks for accessing data from the plurality of third-party data sources 322a-c. For example, a data accessing task may include one or more query operations for scanning and/or projecting a data table from a third-party data source. In some examples, the data accessing task may be executed to access the one or more data segments 413 from the plurality of third-party data sources 322a-c.

A data processing task may include one or more executable tasks for processing data and/or data segments related to the plurality of third-party data sources 322a-c. For instance, a data processing task may be configured to process the one or more data segments 413 from the plurality of third-party data sources 322a-c to generate at least a portion of a result set 414 for the federated query 402. In some examples, a data processing task may include one or more query operations for joining one or more portions of a data table and/or other query operations for processing data segments retrieved from the third-party data sources 322a-c, as described herein.

Each of the compute nodes 410a-c may include individual processing units that may provide storage, networking, memory, and/or processing resources for performing one or more computing tasks related to the plurality of executable tasks 412a-c. In some examples, the compute nodes 410a-c may simultaneously operate to execute one or more of the executable tasks 412a-c in parallel. In some examples, the compute nodes 410a-c may simultaneously operate to execute one or more data accessing tasks and/or one or more data processing tasks related to the plurality of executable tasks 412a-c. Intermediate results from each of the compute nodes 410a-c may be aggregated to generate the result set 414.

In some embodiments, the one or more data accessing tasks are utilized to receive the one or more data segments 413 from the plurality of third-party data sources 322a-c. Additionally, the one or more data accessing tasks may be utilized to receive quality evaluation data 415 for the one or more data segments 413. The quality evaluation data 415 may represent predefined quality attributes, values, thresholds, and/or the like for one or more data segments referenced by the federated query 402. In some examples, one or more portions of the quality evaluation data 415 may correspond to metadata provided by one or more third-party data sources of the third-party data sources 322a-c. Additionally or alternatively, one or more portions of the quality evaluation data 415 may correspond to metadata provided by one or more data stores of the federated query system 302 such as, for example, the metadata store 318.

In some examples, the quality evaluation data 415 may be indicative of contextual data and/or quality criteria for determining quality metrics data 417 for the result set 414. For example, the quality evaluation data 415 may be descriptive of one or more quality metrics such that the quality metrics data 417 may be determined for the result set 414. The quality evaluation data 415 may include one of one or more quality metric values for the one or more data segments 413, timestamp data for a previous update to the one or more data segments 413, a type of quality metric for the one or more data segments 413, and/or other quality evaluation information related to the one or more data segments 413. In some embodiments, one or more portions of the quality evaluation data 415 may be determined based on one or more federated query attributes of the federated query 402. Moreover, the one or more data processing tasks may be utilized to generate the result set 414 for the federated query 402 based on the one or more data segments 413.

In some embodiments, the one or more federated query attributes of the federated query 402 may respectively describe a characteristic of the federated query 402. In some examples, the one or more federated query attributes of the federated query 402 may be indicative of a historical access frequency one or more data segments referenced by the federated query 402. The historical access frequency may be indicative of one or more access patterns for the one or more data segments. By way of example, the historical access frequency may be indicative of a query count for the one or more data segments. In some embodiments, a query count may be a data entity that represents a number of historical queries associated with the federated query 402 over a time duration. In some examples, the historical number of queries may be associated with a time range. The time range may include a time duration preceding a current time such that the query count is dynamically updated based on the current time. In addition, or alternatively, the time range may include a time window with particular start and end times. The start and end times may include a time of day, a day of the week, week of the month, and/or the like.

In some examples, the one or more federated query attributes of the federated query 402 may be indicative of a query complexity for resolving the federated query 402. A query complexity may be based on the syntax tree 404, one or more query operations, the execution plan 406, the executable tasks 412a-c, and/or the like. For example, the query complexity may be based on one or more historical execution times or processing resource requirements for executing one or more portions (e.g., query operations, executable tasks 412a-c, etc.) of the federated query 402. In some examples, the query complexity may be based the third-party data sources 322a-c associated with a federated query 402. For example, the query complexity may be based on one or more access rates, access latencies, and/or the like for the third-party data sources 322a-c.

In some examples, the one or more federated query attributes of the federated query 402 may include a data consumer threshold corresponding to the first party that initiated the federated query 402. For example, the data consumer threshold may be based on an execution frequency, one or more data integrity requirements, and/or the like, of an application configured to leverage the one or more data segments.

In some embodiments, the quality evaluation data 415 is received at least approximately in parallel to receiving and/or processing the one or more data segments 413. For example, one or more portions of the quality evaluation data 415 may be generated least approximately in parallel to receiving and/or processing one or more portions of the one or more data segments 413. Accordingly, the quality evaluation data 415 may be generated in response to the federated query 402 as opposed to a defined asynchronous schedule for the plurality of third-party data sources 322a-c.

In some embodiments, the result set 414 is temporarily stored in an intermediary local data source 312. For example, the intermediary local data source 312 corresponding to the result set 414 may be generated and/or configured to temporarily store the results. In some examples, the intermediary local data source 312 may be generated and/or configured based on a query uniqueness status as described herein. For example, the intermediary local data source 312 may be generated in response to receiving the federated query 402 to anticipate the result set 414. The intermediary local data source 312 may be generated prior to, simultaneously with, and/or after the performance of the federated query 402.

In some embodiments, the intermediary local data source 312 is a data storage entity configured to store, maintain, and/or monitor portions of one or more of the plurality of third-party data sources 322a-c. An intermediary local data source 312 may include a local data store, such a local cache, and/or the like, that is configured to temporarily store one or more result sets from one or more federates queries. By way of example, the intermediary local data source 312 may include one or more cache memories, each configured to store and/or maintain a result dataset for a temporary time duration. In some examples, the intermediary local data source 312 may be configured with one or more time intervals that specify a refresh rate, time-to-live, and/or the like for data stored within the intermediary local data source 312.

In some embodiments, the quality metrics data 417 is generated for the one or more data segments 413 based on the quality evaluation data 415. The quality metrics data 417 may include one or more accuracy indicators for the one or more data segments 413, one or more timeliness indicators for the one or more data segments 413, one or more completeness indicators for the one or more data segments 413, one or more consistency indicators for the one or more data segments 413, one or more validation indicators for the one or more data segments 413, one or more uniqueness indicators for the one or more data segments 413, and/or one or more other quality metrics for the one or more data segments 413.

In some examples, the one or more accuracy indicators may indicate whether values of data in the one or more data segments 413 are within defined limits, whether volume of data in the one or more data segments 413 is within defined limits, whether values of data in the one or more data segments 413 corresponds to a predefined value from a list of predefined values for the one or more data segments, whether a relationship between data in the one or more data segments 413 satisfies defined quality criteria, whether a distribution of data in the one or more data segments 413 satisfies defined quality criteria, etc. The one or more timeliness indicators may indicate whether a timestamp for data and/or data sources for the one or more data segments 413 are within a defined measure of time. The one or more completeness indicators may indicate whether columns, rows, tables, and/or the like for the one or more data segments 413 are missing data. The one or more consistency indicators may indicate whether different data in the one or more segments are configured in a similar manner, format, time, data structure scheme, etc. The one or more validation indicators may indicate whether data in the one or more data segments 413 conform to a set of defined standards (e.g., a set of data format standards, etc.) for the one or more data segments 413. The one or more uniqueness indicators may indicate whether data duplicates exist in the one or more data segments 413.

In some embodiments, the quality metrics data 417 is generated at least approximately in parallel to receiving and/or processing the one or more data segments 413. For example, one or more portions of the quality metrics data 417 may be determined at least approximately in parallel to receiving and/or processing one or more portions of data of the one or more data segments 413. Accordingly, the quality metrics data 417 may be generated in response to the federated query 402 as opposed to a defined asynchronous schedule for the plurality of third-party data sources 322*a-c*.

In some embodiments, an augmented result set 418 for the federated query 402 is generated based on the result set 414 and the quality metrics data 417. For example, the result set 414 may be augmented with the quality metrics data 417 to provide the augmented result set 418. In some examples, the augmented result set 418 may include the quality metrics data 417 augmented with information aggregated from the plurality of third-party data sources 322*a-c* in accordance with a federated query 402. For example, the augmented result set 418 may include respective quality metrics for one or more data segments, such as one or more columns, tables, and/or the like, from the plurality of third-party data sources 322*a-c*. In some examples, the augmented result set 418 may include respective key performance indicators for data associated with the one or more data segments. In some examples, the augmented result set 418 may include metrics related to accuracy, timeliness, completeness, consistency, validation, uniqueness, and/or the like for the one or more data segments.

In some embodiments, one or more portions of a data store (e.g., the metadata store 318 and/or another data store) for the one or more data segments 413 may be updated based on the quality metrics data 417. As a result, one or more future federated queries that reference a corresponding data segment from the plurality of third-party data sources 322*a-c* may obtain an augmented result set based on the updated data (e.g., updated metadata) associated with the quality metrics data 417.

As described herein, due to the complexity of federated queries to multiple disparate data sources, traditional federated query engines may be unable to efficiently query disparate data sources to generate a response for a federated query. Some embodiments of the present disclosure provide improvement to traditional federated query techniques by executing data accessing tasks and/or data processing tasks related to an execution plan. An example of executing data accessing tasks and/or data processing tasks related to an execution plan according to one or more embodiments disclosed herein will now further be described with reference to FIG. 5.

Figure 5:
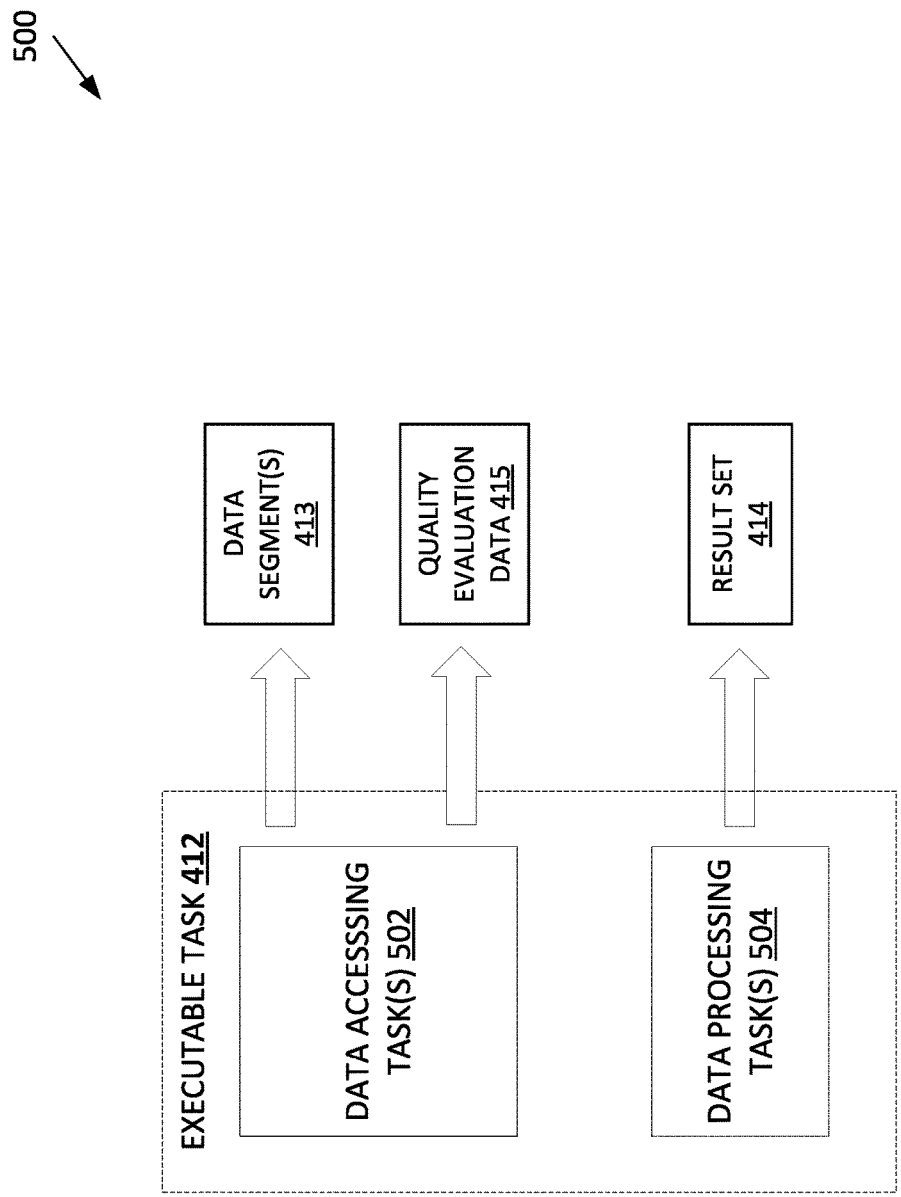
FIG. 5 is a dataflow diagram showing example data structures resulting from execution of data accessing tasks and/or data processing tasks for a federated query in accordance with some embodiments discussed herein.

FIG. 5 is a dataflow diagram 500 showing example data structures resulting from execution of data accessing tasks and/or data processing tasks for a federated query in accordance with some embodiments discussed herein. The dataflow diagram 500 includes an executable task 412. The executable task 412 may be configured as one or more data accessing tasks 502 and/or one or more data processing tasks 504. For example, the executable task 412 may be configured as a unit of work for a compute node to perform one or more data accessing operations and/or one or more data processing operations.

The one or more data accessing tasks 502 may access the plurality of third-party data sources 322*a-c* to retrieve the one or more data segments 413 according to the federated query 402. In some examples, the one or more data accessing tasks 502 may access the metadata store 318, the intermediary local data source 312, and/or one or more other data sources to determine the quality evaluation data 415 for the one or more data segments 413. The one or more data processing tasks 504 may process, monitor, aggregate, augment, sort, and/or filter data from the one or more data segments 413 to generate the result set 414. The one or more data processing tasks 504 may additionally or alternatively perform data analytics with respect to retrieved data associated with the one or more data segments 413. In some examples, the one or more data processing tasks 504 may perform one or more machine learning processes with respect to retrieved data associated with the one or more data segments 413. For instance, the one or more data processing tasks 504 may execute a machine learning model with respect to retrieved data associated with the one or more data segments 413.

In some embodiments, the one or more data accessing tasks 502 may identify one or more third-party data sources related to the one or more data segments 413 referenced in a federated query. The one or more data accessing tasks 502 may additionally query the identified third-party data sources to receive metadata for the referenced data segments. Additionally or alternatively, the one or more data accessing tasks 502 may additionally query one or more internal metadata stores (e.g., the metadata store 318) to receive metadata for the referenced data segments. Based on the metadata received from the third-party data sources and/or the internal metadata stores, the one or more data accessing tasks 502 may generate one or more portions of the quality evaluation data 415. The one or more data processing tasks 504 may generate one or more portions of the result set 414. Additionally, the one or more data processing tasks 504 may generate one or more portions of quality metrics data (e.g., the quality metrics data 417) for the result set 414 based on the quality evaluation data 415.

Figure 6:
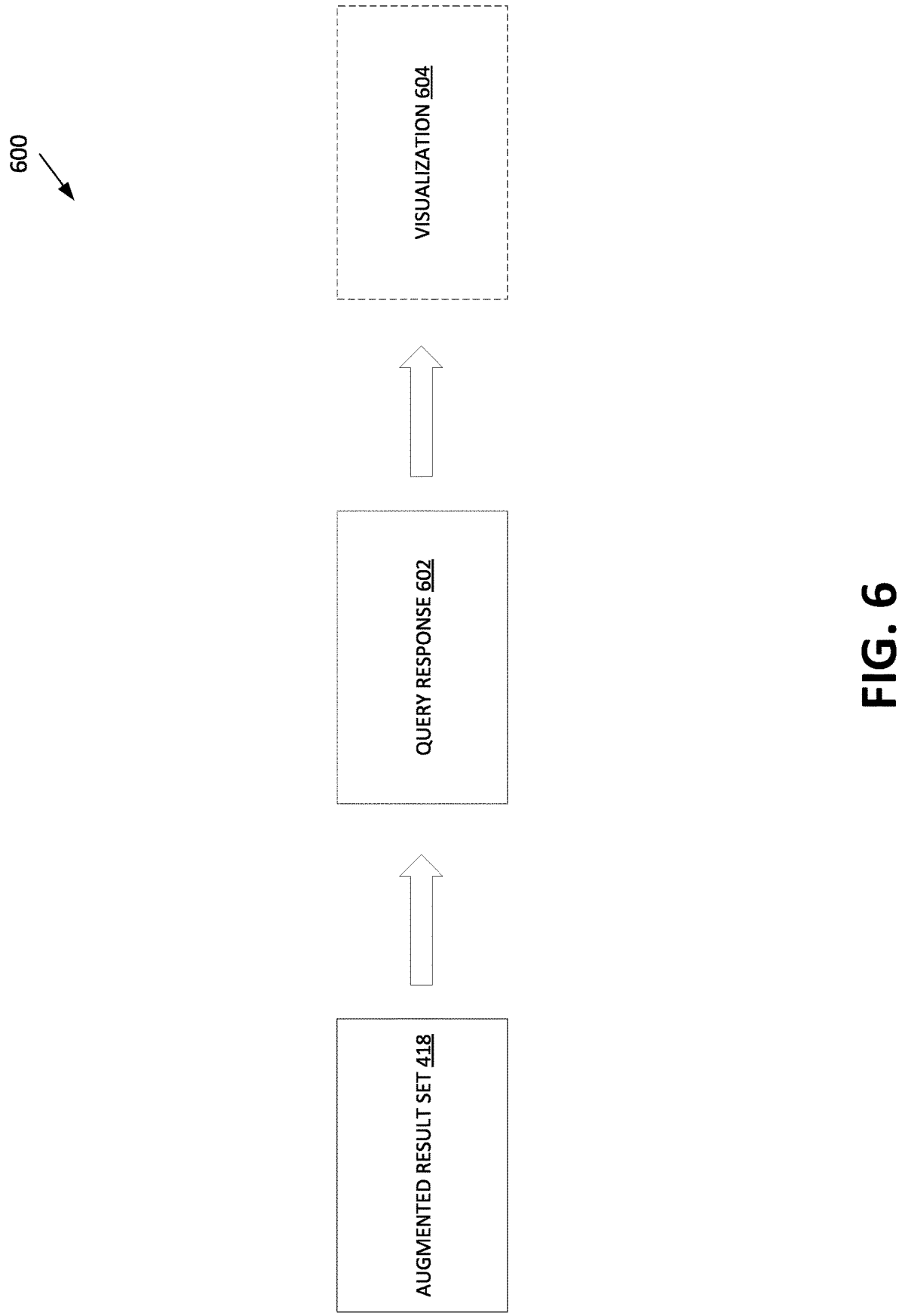
FIG. 6 is a dataflow diagram showing example data structures resulting from an augmented result set in accordance with some embodiments discussed herein.

FIG. 6 is a dataflow diagram 600 showing example data structures resulting from the augmented result set 418 in accordance with some embodiments discussed herein. In some embodiments, the augmented result set 418 may provide a result set characterized based on quality metrics data. For instance, the augmented result set 418 may include a plurality of rows and/or columns of data where respective rows and/or columns are augmented with one or more quality metrics to, for example, indicate reliability, accuracy, timeliness, completeness, consistency, validation, uniqueness, and/or the like for the respective rows and/or columns. In some embodiments, a query response 602 for the federated query 402 is generated based on the augmented result set 418. For example, the query response 602 may include the augmented result set 418. Furthermore, the query response 602 may be provided to a computing entity (e.g., an external computing entity from the external computing entity 112*a-c*) associated with the federated query 402 to render visual data associated with the augmented result set 418 via visualization 604. In some embodiments, the visualization 604 may be rendered via a user interface of the computing entity. The visualization 604 may include, for example, one or more graphical elements for an electronic interface (e.g., an electronic interface of a user device) based on the query response 602.

Figure 7:
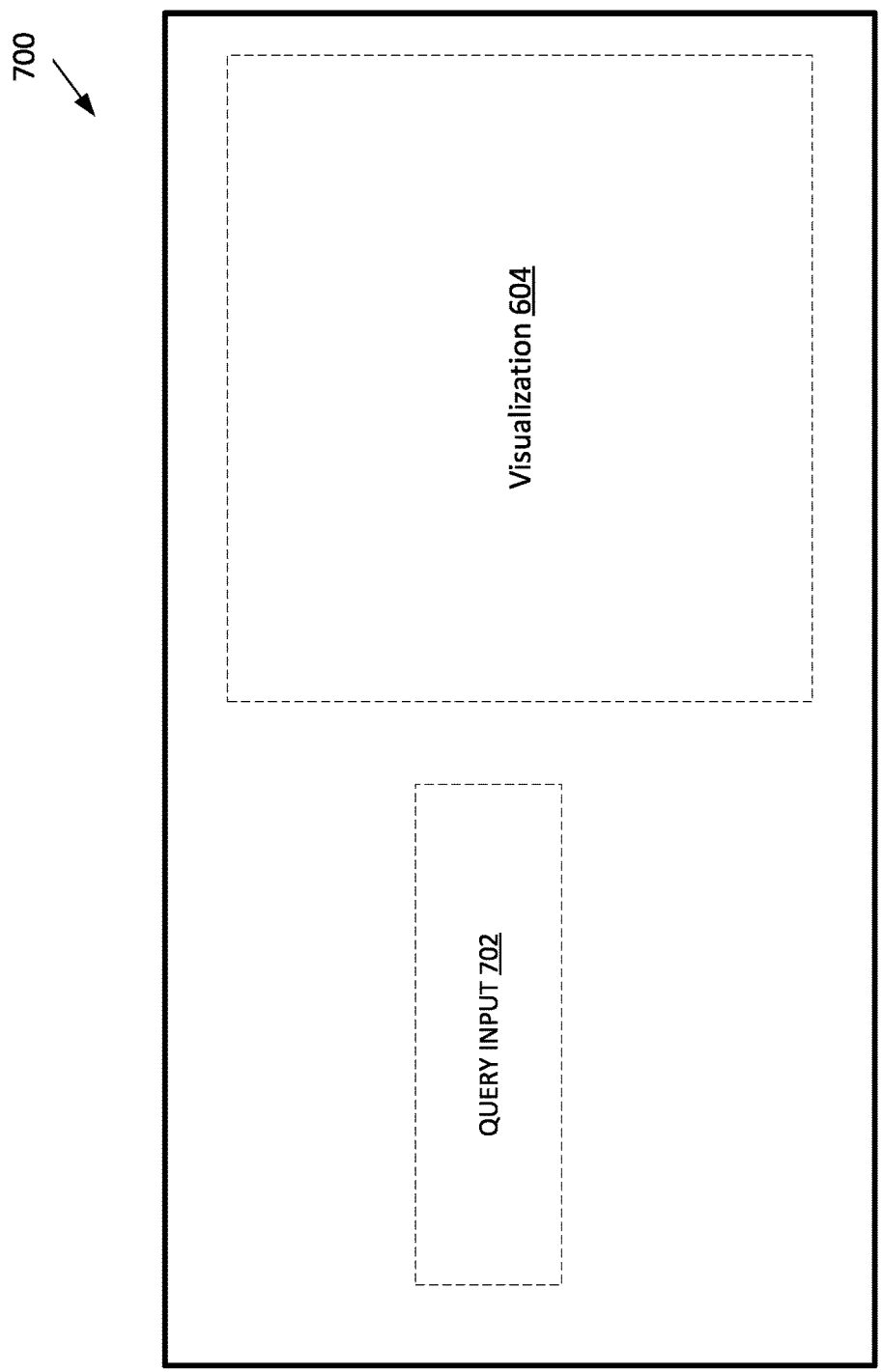
FIG. 7 illustrates an example user interface in accordance with some embodiments discussed herein.

FIG. 7 illustrates an example user interface 700 for providing visualizations, in accordance with one or more embodiments of the present disclosure. In one or more embodiments, the user interface 700 is, for example, an electronic interface (e.g., a graphical user interface) of the external computing entity 112. In various embodiments, the user interface 700 may be provided via external entity output device 220 (e.g., a display) of the external computing entity 112. The user interface 700 may be configured to render the visualization 604. In various embodiments, the visualization 604 may provide a visualization of the augmented result set 418. For example, the visualization 604 may render one or more visual elements related to the result set 414 and the quality metrics data 417. In some embodiments, the user interface 700 may be configured as a user interface for clinical decision automation (e.g., a clinical decision support user interface, a disease diagnosis support user interface, etc.) related to medical records for one or more patients. In some embodiment, the user interface 700 includes query input 702 configured to facilitate generation of the federated query 402. For example, a query request related to the federated query 402 and/or information associated therewith may be input via the query input 702.

Figure 8:
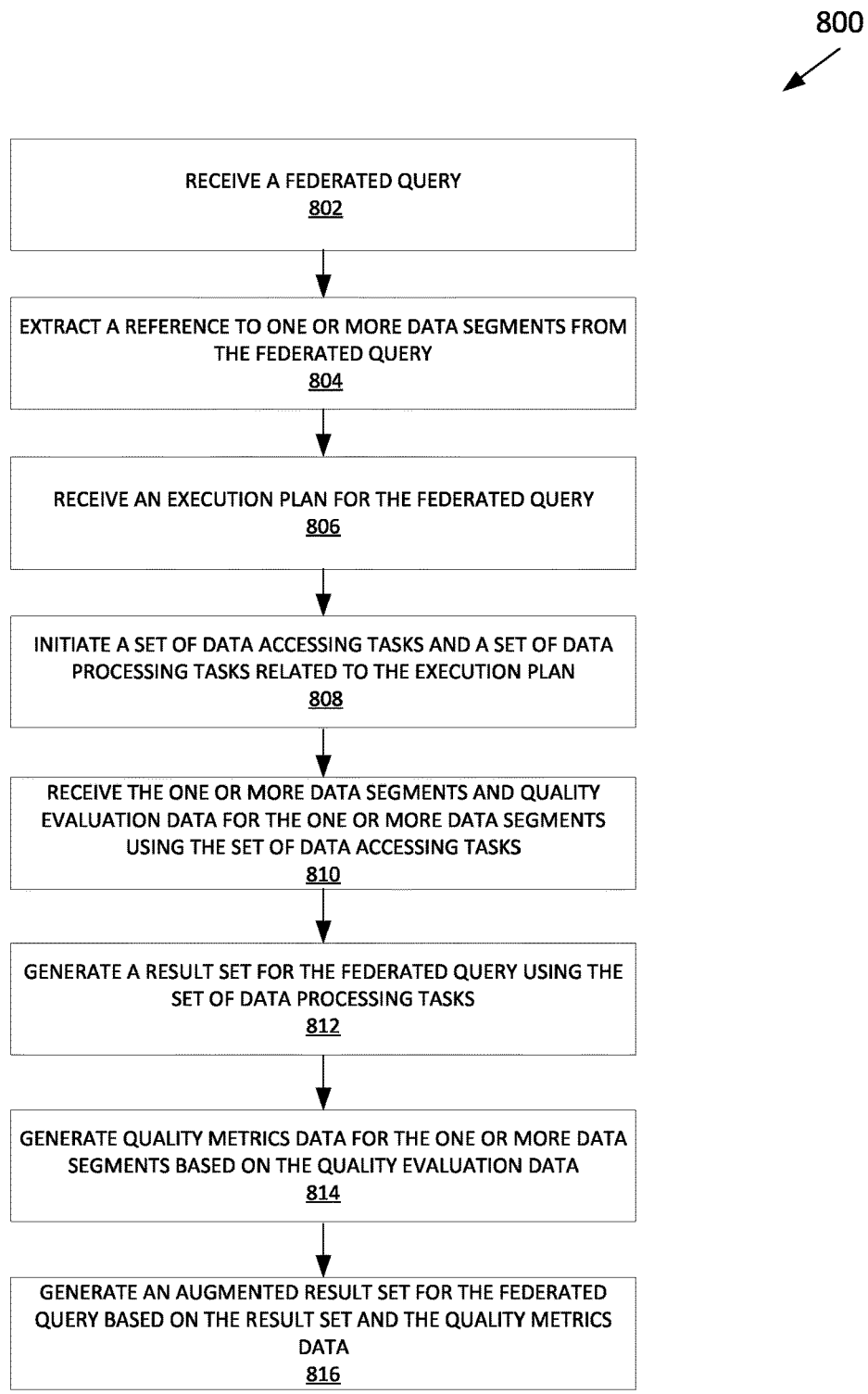
FIG. 8 is a flowchart showing an example of a process for providing quality evaluation and augmentation of data provided by a federated query system in accordance with some embodiments discussed herein.

FIG. 8 is a flowchart showing an example of a process 800 for providing quality evaluation and augmentation of data provided by a federated query system in accordance with some embodiments discussed herein. The flowchart depicts federated query processing techniques for dynamically evaluating and/or augmenting result sets generated by a federated query engine to overcome various limitations of traditional federated query engines. The federated query processing techniques may be implemented by one or more computing devices, entities, and/or systems described herein. For example, via the various steps/operations of the process 800, the computing system 100 may leverage the federated query processing techniques to overcome the various limitations with traditional federated query engines by minimizing computing resources and/or a number of queries with respect to disparate data sources.

FIG. 8 illustrates an example process 800 for explanatory purposes. Although the example process 800 depicts a particular sequence of steps/operations, the sequence may be altered without departing from the scope of the present disclosure. For example, some of the steps/operations depicted may be performed in parallel or in a different sequence that does not materially impact the function of the process 800. In other examples, different components of an example device or system that implements the process 800 may perform functions at substantially the same time or in a specific sequence.

In some embodiments, the process 800 includes, at step/operation 802, receiving (e.g., by the computing system 100) a federated query. The federated query may be received via a gateway (e.g., an API gateway) of a federated query system communicatively coupled to a plurality of third-party data sources. The federated query may be a data entity that represents a query to one or more of the plurality of third-party data sources. The federated query may also include a logical query statement that defines a plurality of query operations for accessing, receiving and/or processing data from one or more of the plurality of third-party data sources.

In some embodiments, the process 800 includes, at step/operation 804, extracting (e.g., by the computing system 100) a reference to one or more data segments from the federated query. For example, the federated query may reference one or more data segments from a plurality of third-party data sources.

In some embodiments, the process 800 includes, at step/operation 806, receiving (e.g., by the computing system 100) an execution plan for the federated query. For instance, the execution plan may include a plurality of executable tasks for generating a result set from a plurality of third-party data sources. In some examples, the execution plan is generated by a federated query engine according to an optimized execution strategy. In some examples, each of the plurality of executable tasks may include one or more query operations for performing a portion of the federated query. For example, each of the plurality of executable tasks may include one or more data accessing tasks and one or more data processing tasks for performing a portion of the federated query.

In some embodiments, the process 800 includes, at step/operation 808, initiating (e.g., by the computing system 100) a set of data accessing tasks and a set of data processing tasks related to the execution plan. The set of data accessing tasks may be configured for accessing the one or more data segments from the plurality of third-party data sources. The set of data processing tasks may be configured for processing the one or more data segments accessed via the set of data accessing tasks.

In some embodiments, the process 800 includes, at step/operation 810, receiving (e.g., by the computing system 100) the one or more data segments and quality evaluation data for the one or more data segments using the set of data accessing tasks. The quality evaluation data may include one of one or more quality metric values for the one or more data segments, timestamp data for a previous update to the one or more data segments, a type of quality metric for the one or more data segments, and/or other quality evaluation information related to the one or more data segments.

In some embodiments, the process 800 includes, at step/operation 812, generating (e.g., by the computing system 100) a result set for the federated query using the set of data processing tasks. The result set may be a data entity that represents a result generated by resolving the federated query. The result set may include a dataset that includes information accessed, extracted, aggregated and/or processed from one or more of the plurality of third-party data sources in accordance with the federated query. For example, the result set may include the one or more data segments and/or a modified version of the one or more data segments, such as one or more columns, tables, and/or the like, from one or more of the third-party data sources. The data segments may be joined, aggregated, and/or otherwise processed via the set of data processing tasks to generate the result set.

In some embodiments, the process 800 includes, at step/operation 814, generating (e.g., by the computing system 100) quality metrics data for the one or more data segments based on the quality evaluation data. The quality metrics data may include one or more accuracy indicators for the one or more data segments, one or more timeliness indicators for the one or more data segments, one or more completeness indicators for the one or more data segments, one or more consistency indicators for the one or more data segments, one or more validation indicators for the one or more data segments, one or more uniqueness indicators for the one or more data segments, and/or one or more other quality metrics for the one or more data segments.

In some embodiments, the process 800 includes, at step/operation 816, generating (e.g., by the computing system 100) an augmented result set for the federated query based on the result set and the quality metrics data. For example, the result set may be augmented with the quality metrics data to provide the augmented result set for the federated query.

In some embodiments, the process 800 includes initiating the performance of the execution plan to generate the result set. For example, the computing system 100 may initiate the performance of the execution plan to generate the result set. For instance, the computing system 100 may initiate the performance of the federated query based on the execution plan in response to a determination that the federated query is a unique query. By enabling the determination of unique federated queries, the process 800 may improve the allocation of computing resources by reducing the execution of redundant federated queries. In this way, some embodiments of the present disclosure may be practically applied to provide a technical improvement to computers and, more specifically, to federated queries engines.

Some techniques of the present disclosure enable the generation of action outputs (e.g., query-based output actions, etc.) that may be performed to initiate one or more actions to achieve real-world effects. The data querying techniques of the present disclosure may be used, applied, and/or otherwise leveraged to generate predictive quality metric representations, such as query responses, metadata, electronic communications, visualizations, and/or predictions. These outputs may be leveraged to initiate the performance of various computing tasks that improve the performance of a computing system (e.g., a computer itself, etc.) with respect to various actions performed by the computing system.

In some examples, the computing tasks may include actions that may be based on a prediction domain. A prediction domain may include any environment in which computing systems may be applied to achieve real-word insights, such as quality metric predictions, and initiate the performance of computing tasks, such as actions, to act on the real-world insights. These actions may cause real-world changes, for example, by controlling a hardware component, providing targeted alerts, rendering visual data via an electronic interface, automatically allocating computing resources, optimizing data storage or data sources, and/or the like.

Examples of prediction domains may include financial systems, clinical systems, medical data systems, autonomous systems, robotic systems, and/or the like. Actions in such domains may include the initiation of automated instructions across and between devices, automated notifications, automated scheduling operations, automated precautionary actions, automated security actions, automated data processing actions, automated server load balancing actions, automated computing resource allocation actions, automated adjustments to computing and/or human resource management, and/or the like.

As one example, a prediction domain may include a clinical prediction domain. In such a case, the predictive actions may include automated physician notification actions, automated patient notification actions, automated appointment scheduling actions, automated prescription recommendation actions, automated drug prescription generation actions, automated implementation of precautionary actions, automated record updating actions, automated datastore updating actions, automated hospital preparation actions, automated workforce management operational management actions, automated server load balancing actions, automated resource allocation actions, automated call center preparation actions, automated hospital preparation actions, automated pricing actions, automated plan update actions, automated alert generation actions, and/or the like.

In some embodiments, the techniques of the process 800 are applied to initiate the performance of one or more actions. As described herein, the actions may depend on the prediction domain. In some examples, the computing system 100 may leverage the techniques of the process 800 to generate query responses, metadata, electronic communications, visualizations, and/or predictions. Accordingly, the computing system 100 may generate an action output that is personalized and tailored to a federated query at a particular moment in time. The one or more actions may further include displaying visual renderings of data and/or related quality metrics in addition to values, charts, and representations associated with third-party data sources and/or third-party data segments thereof.

VI. Conclusion

Many modifications and other embodiments will come to mind to one skilled in the art to which the present disclosure pertains having the benefit of the teachings presented in the foregoing descriptions and the associated drawings. Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

VII. Examples

Example 1. A computer-implemented method, the computer-implemented method comprising: receiving, by one or more processors, a federated query that references one or more data segments from a plurality of third-party data sources; receiving, by the one or more processors, an execution plan for the federated query, wherein the execution plan comprises a plurality of executable tasks for resolving the federated query, and the plurality of executable tasks comprises (i) a set of data accessing tasks for accessing the one or more data segments from the plurality of third-party data sources and (ii) a set of data processing tasks for processing the one or more data segments to generate a result set for the federated query; receiving, by the one or more processors and using the set of data accessing tasks, the one or more data segments from the plurality of third-party data sources and quality evaluation data for the one or more data segments; generating, by the one or more processors and using the set of data processing tasks, the result set for the federated query based on the one or more data segments; generating, by the one or more processors, quality metrics data for the one or more data segments based on the quality evaluation data; and generating, by the one or more processors, an augmented result set for the federated query based on the result set and the quality metrics data.

Example 2. The computer-implemented method of any of the preceding examples, further comprising: receiving the quality evaluation data at least approximately in parallel to receiving the one or more data segments.

Example 3. The computer-implemented method of any of the preceding examples, further comprising: generating the quality metrics data at least approximately in parallel to processing the one or more data segments.

Example 4. The computer-implemented method of any of the preceding examples, further comprising: receiving the federated query via an application programming interface (API) gateway of a federated query system communicatively coupled to the plurality of third-party data sources.

Example 5. The computer-implemented method of any of the preceding examples, further comprising: determining the quality evaluation data based on one or more federated query attributes of the federated query.

Example 6. The computer-implemented method of any of the preceding examples, further comprising: determining at least one of one or more quality metric values for the one or more data segments, timestamp data for a previous update to the one or more data segments, and a type of quality metric for the one or more data segments.

Example 7. The computer-implemented method of any of the preceding examples, further comprising: providing a query response with the augmented result set to a computing entity associated with the federated query to render visual data associated with the augmented result set via a user interface of the computing entity.

Example 8. The computer-implemented method of any of the preceding examples, further comprising: updating one or more portions of a metadata store for the one or more data segments based on the quality metrics data.

Example 9. The computer-implemented method of any of the preceding examples, wherein the federated query is a first federated query, the augmented result set is a first augmented result set, and the computer-implemented method further comprises: receiving a second federated query that references the one or more data segments from the plurality of third-party data sources; and generating a second augmented result set for the second federated query based on metadata associated with the quality metrics data.

Example 10. A system comprising memory and one or more processors communicatively coupled to the memory, the one or more processors configured to receive a federated query that references one or more data segments from a plurality of third-party data sources; receive an execution plan for the federated query, wherein the execution plan comprises a plurality of executable tasks for resolving the federated query, and the plurality of executable tasks comprises (i) a set of data accessing tasks for accessing the one or more data segments from the plurality of third-party data sources and (ii) a set of data processing tasks for processing the one or more data segments to generate a result set for the federated query; receive, using the set of data accessing tasks, the one or more data segments from the plurality of third-party data sources and quality evaluation data for the one or more data segments; generate, using the set of data processing tasks, the result set for the federated query based on the one or more data segments; generate quality metrics data for the one or more data segments based on the quality evaluation data; and generate an augmented result set for the federated query based on the result set and the quality metrics data.

Example 11. The system of any of the preceding examples, wherein the one or more processors are further configured to receive the quality evaluation data at least approximately in parallel to receiving the one or more data segments.

Example 12. The system of any of the preceding examples, wherein the one or more processors are further configured to generate the quality metrics data at least approximately in parallel to processing the one or more data segments.

Example 13. The system of any of the preceding examples, wherein the one or more processors are further configured to receive the federated query via an application programming interface (API) gateway of a federated query system communicatively coupled to the plurality of third-party data sources.

Example 14. The system of any of the preceding examples, wherein the one or more processors are further configured to determine the quality evaluation data based on one or more federated query attributes of the federated query.

Example 15. The system of any of the preceding examples, wherein the one or more processors are further configured to determine at least one of one or more quality metric values for the one or more data segments, timestamp data for a previous update to the one or more data segments, and a type of quality metric for the one or more data segments.

Example 16. The system of any of the preceding examples, wherein the one or more processors are further configured to provide a query response with the augmented result set to a computing entity associated with the federated query to render visual data associated with the augmented result set via a user interface of the computing entity.

Example 17. The system of any of the preceding examples, wherein the one or more processors are further configured to update one or more portions of a metadata store for the one or more data segments based on the quality metrics data.

Example 18. The system of any of the preceding examples, wherein the federated query is a first federated query, the augmented result set is a first augmented result set, and the one or more processors are further configured to receive a second federated query that references the one or more data segments from the plurality of third-party data sources; and generate a second augmented result set for the second federated query based on metadata associated with the quality metrics data.

Example 19. One or more non-transitory computer-readable storage media including instructions that, when executed by one or more processors, cause the one or more processors to receive a federated query that references one or more data segments from a plurality of third-party data sources; receive an execution plan for the federated query, wherein the execution plan comprises a plurality of executable tasks for resolving the federated query, and the plurality of executable tasks comprises (i) a set of data accessing tasks for accessing the one or more data segments from the plurality of third-party data sources and (ii) a set of data processing tasks for processing the one or more data segments to generate a result set for the federated query; receive, using the set of data accessing tasks, the one or more data segments from the plurality of third-party data sources and quality evaluation data for the one or more data segments; generate, using the set of data processing tasks, the result set for the federated query based on the one or more data segments; generate quality metrics data for the one or more data segments based on the quality evaluation data; and generate an augmented result set for the federated query based on the result set and the quality metrics data.

Example 20. The one or more non-transitory computer-readable storage media of any of the preceding examples, wherein the instructions further cause the one or more processors to provide a query response with the augmented result set to a computing entity associated with the federated query to render visual data associated with the augmented result set via a user interface of the computing entity.

The invention claimed is:

1. A computer-implemented method comprising:
receiving, by one or more processors, a federated query that references one or more data segments from a plurality of third-party data sources;
receiving, by the one or more processors, an execution plan for the federated query, wherein the execution plan comprises a plurality of executable tasks for resolving the federated query, and the plurality of executable tasks comprises (i) a data accessing task for accessing the one or more data segments from the plurality of third-party data sources and (ii) a data processing task for processing the one or more data segments to generate a result set for the federated query;
receiving, by the one or more processors and using the data accessing task, the one or more data segments from the plurality of third-party data sources;
generating, by the one or more processors and using the data processing task, the result set for the federated query based on the one or more data segments;
receiving, by the one or more processors and based on one or more federated query attributes of the federated query, quality evaluation data indicative of one or more predefined quality attributes for the one or more data segments;
generating, by the one or more processors and based on the quality evaluation data, quality metrics data indicative of one or more quality metrics for the one or more data segments;
generating, by the one or more processors, an augmented result set for the federated query by augmenting the result set with the quality metrics data; and
generating, by the one or more processors, a query response that comprises the augmented result set to visually indicate the one or more quality metrics for the one or more data segments.

2. The computer-implemented method of claim 1, wherein receiving the quality evaluation data comprises:
receiving the quality evaluation data at least approximately in parallel to receiving the one or more data segments.

3. The computer-implemented method of claim 1, wherein generating the quality metrics data comprises:
generating the quality metrics data at least approximately in parallel to processing the one or more data segments.

4. The computer-implemented method of claim 1, wherein receiving the federated query comprises:
receiving the federated query via an application programming interface (API) gateway of a federated query system communicatively coupled to the plurality of third-party data sources.

5. The computer-implemented method of claim 1, wherein the quality evaluation data comprises timestamp data for one or more previous updates to the one or more data segments, and wherein generating the quality metrics data comprises:
comparing a federated query timestamp for the federated query to the timestamp data.

6. The computer-implemented method of claim 1, wherein determining the quality evaluation data comprises:
determining a type of quality metric for the one or more data segments.

7. The computer-implemented method of claim 1, further comprising:
providing the query response that comprises the augmented result set to a computing entity associated with the federated query to render visual data associated with the augmented result set via a user interface of the computing entity.

8. The computer-implemented method of claim 1, further comprising:
updating one or more portions of a metadata store for the one or more data segments based on the quality metrics data.

9. The computer-implemented method of claim 8, wherein the federated query is a first federated query, the augmented result set is a first augmented result set, and the computer-implemented method further comprises:
receiving a second federated query that references the one or more data segments from the plurality of third-party data sources; and
generating a second augmented result set for the second federated query based on metadata associated with the quality metrics data.

10. A system comprising:
one or more processors; and
one or more memories storing processor-executable instructions that, when executed by the one or more processors, cause the one or more processors to perform operations comprising:
receiving a federated query that references one or more data segments from a plurality of third-party data sources;
receiving an execution plan for the federated query, wherein the execution plan comprises a plurality of executable tasks for resolving the federated query, and the plurality of executable tasks comprises (i) a data accessing task for accessing the one or more data segments from the plurality of third-party data sources and (ii) a data processing task for processing the one or more data segments to generate a result set for the federated query;
receiving, using the data accessing task, the one or more data segments from the plurality of third-party data sources;
generating, using the data processing task, the result set for the federated query based on the one or more data segments;
receiving, based on one or more federated query attributes of the federated query, quality evaluation data indicative of one or more predefined quality attributes for the one or more data segments;
generating, based on the quality evaluation data, quality metrics data indicative of one or more quality metrics for the one or more data segments;
generating an augmented result set for the federated query by augmenting the result set with the quality metrics data; and
generating a query response that comprises the augmented result set to visually indicate the one or more quality metrics for the one or more data segments.

11. The system of claim 10, wherein receiving the quality evaluation data comprises:
receiving the quality evaluation data at least approximately in parallel to receiving the one or more data segments.

12. The system of claim 10, wherein generating the quality metrics data comprises:
generating the quality metrics data at least approximately in parallel to processing the one or more data segments.

13. The system of claim 10, wherein the processor-executable instructions, when executed by the one or more processors, further cause the one or more processors to perform operations comprising:
receiving the federated query via an application programming interface (API) gateway of a federated query system communicatively coupled to the plurality of third-party data sources.

14. The system of claim 10, wherein the quality evaluation data comprises timestamp data for one or more previous updates to the one or more data segments, and wherein generating the quality metrics data comprises:
comparing a federated query timestamp for the federated query to the timestamp data.

15. The system of claim 10, wherein determining the quality evaluation data comprises:
determining a type of quality metric for the one or more data segments.

16. The system of claim 10, wherein the processor-executable instructions, when executed by the one or more processors, further cause the one or more processors to perform operations comprising:
providing the query response that comprises the augmented result set to a computing entity associated with the federated query to render visual data associated with the augmented result set via a user interface of the computing entity.

17. The system of claim 10, wherein the processor-executable instructions, when executed by the one or more processors, further cause the one or more processors to perform operations comprising:
updating one or more portions of a metadata store for the one or more data segments based on the quality metrics data.

18. The system of claim 17, wherein the federated query is a first federated query, the augmented result set is a first augmented result set, and the processor-executable instructions, when executed by the one or more processors, further cause the one or more processors to perform operations comprising:
receiving a second federated query that references the one or more data segments from the plurality of third-party data sources; and
generating a second augmented result set for the second federated query based on metadata associated with the quality metrics data.

19. One or more non-transitory computer-readable storage media storing processor-executable instructions that, when executed by one or more processors, cause the one or more processors to perform operations comprising:
receiving a federated query that references one or more data segments from a plurality of third-party data sources;
receiving an execution plan for the federated query, wherein the execution plan comprises a plurality of executable tasks for resolving the federated query, and the plurality of executable tasks comprises (i) a data accessing task for accessing the one or more data segments from the plurality of third-party data sources and (ii) a data processing task for processing the one or more data segments to generate a result set for the federated query;
receiving, using the data accessing task, the one or more data segments from the plurality of third-party data sources;
generating, using the data processing task, the result set for the federated query based on the one or more data segments;
receiving, based on one or more federated query attributes of the federated query, quality evaluation data indicative of one or more predefined quality attributes for the one or more data segments;
generating, based on the quality evaluation data, quality metrics data indicative of one or more quality metrics for the one or more data segments;
generating an augmented result set for the federated query by augmenting the result set with the quality metrics data; and
generating a query response that comprises the augmented result set to visually indicate the one or more quality metrics for the one or more data segments.

20. The one or more non-transitory computer-readable storage media of claim 19, wherein the processor-executable instructions, when executed to by the one or more processors, further cause the one or more processors to perform operations comprising:
providing the query response that comprises the augmented result set to a computing entity associated with the federated query to render visual data associated with the augmented result set via a user interface of the computing entity.

* * * * *